(12) United States Patent
Pitkänen et al.

(10) Patent No.: US 10,146,923 B2
(45) Date of Patent: Dec. 4, 2018

(54) AUDIOVISUAL ASSOCIATIVE AUTHENTICATION METHOD, RELATED SYSTEM AND DEVICE

(71) Applicant: APLComp Oy, Helsinki (FI)

(72) Inventors: Martti Pitkänen, Helsinki (FI); Robert Parts, Saue (EE); Pirjo Huuhka-Pitkänen, Helsinki (FI)

(73) Assignee: APLComp Oy, Helsinki (FI)

( * ) Notice: Subject to any disclaimer, the term of this patent is extended or adjusted under 35 U.S.C. 154(b) by 0 days.

(21) Appl. No.: 15/559,793

(22) PCT Filed: Mar. 21, 2016

(86) PCT No.: PCT/FI2016/050174
§ 371 (c)(1),
(2) Date: Sep. 19, 2017

(87) PCT Pub. No.: WO2016/151193
PCT Pub. Date: Sep. 29, 2016

(65) Prior Publication Data
US 2018/0068103 A1 Mar. 8, 2018

(30) Foreign Application Priority Data

Mar. 20, 2015 (FI) .................................. 20155197
Dec. 17, 2015 (FI) ................................ 20154223 U

(51) Int. Cl.
*H04L 29/06* (2006.01)
*G06F 21/32* (2013.01)
(Continued)

(52) U.S. Cl.
CPC .............. *G06F 21/32* (2013.01); *G10L 17/22* (2013.01); *H04L 63/0861* (2013.01);
(Continued)

(58) Field of Classification Search
CPC ..... G06F 21/32; G10L 17/22; H04L 63/0861; G06Q 20/3674; G07C 9/00158; H04W 12/06
See application file for complete search history.

(56) References Cited

U.S. PATENT DOCUMENTS 2,349,764 A * 5/1944 Sheldon .................... G02C 1/02
351/108
5,748,843 A * 5/1998 Peck ...................... D05B 19/02
112/277
(Continued)

FOREIGN PATENT DOCUMENTS

EP 1074974 A2 2/2001
EP 1669836 A1 6/2006
(Continued)

OTHER PUBLICATIONS

Finnish Patent and Registration Office, Search report issuen in appln. No. FI20155197 dated Jun. 25, 2015.
(Continued)

*Primary Examiner* — Ghodrat Jamshidi
(74) *Attorney, Agent, or Firm* — Berggren LLP

(57) ABSTRACT

Electronic system for authenticating a user of an electronic service, said system preferably comprising at least one server apparatus, the system being configured to store, for a number of users, a plurality of personal voice-prints each of which being linked with a dedicated visual, audiovisual or audio cue, for challenge-response authentication of the users, wherein the cues are user-selected, user-provided or user-created, pick, upon receipt of an authentication request associated with a claim of an identity of an existing user of said number of users, a subset of cues for which there are voiceprints of the existing user stored, and provide the cues for representation to the user as a challenge, receive sound
(Continued)

data indicative of the voice responses uttered by the user to the represented cues.

18 Claims, 9 Drawing Sheets

(51) Int. Cl.
*H04W 12/06* (2009.01)
*G10L 17/22* (2013.01)
*G06Q 20/36* (2012.01)
*G07C 9/00* (2006.01)

(52) U.S. Cl.
CPC ........ *H04W 12/06* (2013.01); *G06Q 20/3674* (2013.01); *G07C 9/00158* (2013.01)

(56) References Cited

U.S. PATENT DOCUMENTS

| | | |
|---|---|---|
| 8,832,813 B1 | 9/2014 | Cai et al. |
| 2005/0171851 A1 | 8/2005 | Applebaum et al. |
| 2007/0061865 A1 | 3/2007 | Bermudez et al. |
| 2007/0094497 A1 | 4/2007 | O'Gorman et al. |
| 2009/0112589 A1* | 4/2009 | Hiselius ................ H04M 1/576 704/246 |
| 2009/0116703 A1 | 5/2009 | Schultz |
| 2011/0071831 A1 | 3/2011 | Garcia Gomar et al. |
| 2011/0276323 A1 | 11/2011 | Seyfetdinov |
| 2012/0194552 A1* | 8/2012 | Osterhout .......... G02B 27/0093 345/633 |
| 2012/0200601 A1* | 8/2012 | Osterhout .......... G02B 27/0093 345/633 |
| 2013/0063550 A1* | 3/2013 | Ritchey ................ G16H 40/63 348/36 |
| 2013/0133033 A1* | 5/2013 | Davis .................... G06F 21/316 726/3 |
| 2013/0227678 A1* | 8/2013 | Kang .................... G06F 21/32 726/19 |
| 2013/0276079 A1 | 10/2013 | Foulds et al. |
| 2014/0129231 A1* | 5/2014 | Herring ................ G10L 25/51 704/270.1 |
| 2015/0073808 A1* | 3/2015 | Basir .................... G06F 3/0487 704/275 |

FOREIGN PATENT DOCUMENTS

| | | |
|---|---|---|
| GB | 2349764 A | 11/2000 |
| JP | 2007017840 A | 1/2007 |

OTHER PUBLICATIONS

European Patent Office, Supplementary European Search Report issued on EP16767809.3, dated Aug. 24, 2018.

* cited by examiner

AUDIOVISUAL ASSOCIATIVE AUTHENTICATION METHOD, RELATED SYSTEM AND DEVICE

PRIORITY

This application is a U.S national application of PCT application PCT/FI2016/050174 filed on Mar. 21, 2016 and claiming priority of Finnish applications Fl 20155197 filled on Mar. 20, 2015 and Fl U20154223 filed on Dec. 17, 2015, the contents of all of which are incorporated herein by reference.

FIELD OF THE INVENTION

Generally the invention pertains to computers and related communications infrastructures. In particular, the present invention concerns authentication relative to an electronic device or electronic service.

BACKGROUND

Access control in conjunction with e.g. network services or physical resources may imply user identification, which can be generally based on a variety of different approaches. For example, three categories may be considered including anonymous, standard and strong identification. Regarding anonymous case, the service users do not have to be and are not identified. Standard, or 'normal', identification may refer to what the requestor for access knows, such as a password, or bears such as a physical security token. Such a token may include password-generating device (e.g. SecurID™), a list of one-time passwords, a smart card and a reader, or a one-time password transmitted to a mobile terminal. Further, strong identification may be based on a biometric property, particularly a biometrically measurable property, of a user, such as a fingerprint or retina, or a security token the transfer of which between persons is difficult, such as a mobile terminal including a PKI (Public Key Infrastructure) certificate requiring entering a PIN (Personal Identification Number) code upon each instance of use.

On the other hand, network service-related authentication, i.e. reliable identification, may also be implemented on several levels, e.g. on four levels, potentially including unnecessary, weak, strongish, and strong authentication, wherein the strongish authentication, being stronger than weak, thus resides between the weak and strong options. If the user may remain anonymous, authentication is unnecessary. Weak authentication may refer to the use of single standard category identification means such as user ID/password pair. Instead, strongish authentication may apply at least two standard identification measures utilizing different techniques. With strong authentication, at least one of the identification measures should be strong.

Notwithstanding the various advancements taken place during the last years in the context of user and service identification, authentication, and related secure data transfer, some defects still remain therewith and are next briefly and non-exhaustively reviewed with useful general background information.

Roughly, access control methods to network services include push and pull methods. In pull methods, a user may first identify oneself anonymously to a network service providing a login screen in return. The user may then type in the user ID and a corresponding password, whereupon he/she may directly access the service or be funneled into the subsequent authentication phase. In push methods, a network server may first transmit information to the e-mail address of the user in order to authorize accessing the service. Preferably only the user knows the password of the e-mail account.

The users are often reluctant to manually manage a plurality of user IDs and corresponding passwords. As a result, they may utilize the very same user ID and/or password in multiple services and/or use rather obvious and thus easy-to-crack words, numbers or expressions as passwords. Even if the access control management systems require using a strong password, i.e. hard-to-remember password, a risk that the user writes the password down increases considerably and the authentication level turns ultimately weak.

Yet, the utilization of a password is typically enabled by access control management entity that may also store the password locally. If the security of the data repository is later jeopardized; third parties may acquire all the passwords stored therein. Also if the user forgets the password or it has to be changed for some other reason, actions have to be taken by the user and optionally service provider. The user has to memorize the new password.

Further, the adoption of a personal, potentially network service-specific or physically accessible resource or location-specific token, such as a smartcard, e.g. SecurID™, and a related reader device may require intensive training. The increase in the use of smart cards correspondingly raises the risk of thefts and provision of replacement cards. In case the personal tokens apply a common (distributed) secure algorithm, the theft of such algorithm would cause tremendous security issues and trigger massive update operations regarding the associated elements such as tokens in order to recover at least part of the original security.

For instance, in the context of cloud services such as cloud virtual-desktop services that may be regularly, e.g. daily, utilized by a user, the nowadays available access control procedures, especially identification and authentication solutions applied upon logging in to the service, are typically either inadequate in terms of the achieved data security or simply awkward from the standpoint of usability with reference to the aforesaid lengthy and strong, i.e. complex and thus hard-to-remember passwords.

SUMMARY OF THE INVENTION

The objective is to at least alleviate one or more problems described hereinabove regarding the usability and security issues, such as authentication or access control, associated with the contemporary remote computer systems and related electronic services, such as online services, or e.g. access to physical resources or locations.

The objective is achieved by the system and method in accordance with the present invention. The suggested solution cleverly harnesses, among other factors, personal characteristics such as the associative memory and voice of a user for electronic authentication as described in more detail hereinafter.

In an aspect of the present invention, a system for authenticating a user of an electronic service, comprises at least one server apparatus preferably provided with a processing entity and a memory entity for processing and storing data, respectively, and a data transfer entity for receiving and sending data, the system being configured to store, for a number of users, a plurality of personal voiceprints each of which linked with a dedicated visual, audiovisual or audio cue, for challenge-response authentication of the users, the cues being user-selected, user-provided or user-created, pick, upon receipt of an authentication request associated with a claim of an identity of an existing user of said number of users, a subset of cues for which there are voiceprints of the existing user stored, and provide the cues for representation to the user as a challenge, receive sound data indicative of the voice responses uttered by the user to the represented cues, the voice responses represented by the sound data being captured simultaneously utilizing an air microphone and contact microphone optionally integrated in a common dual-microphone apparatus, said sound data preferably including both air microphone-based data and contact microphone-based data, determine on the basis of the sound data, the represented cues and voiceprints linked therewith and the existing user, whether the response has been uttered by the existing user of said number of users, wherein the sound data indicative of the voice responses uttered to the represented cues are preferably matched as concatenated against a concatenated voiceprint established based on the voiceprints linked with the represented cues and the existing user, and provided that this seems to be the case, elevate the authentication status of the user as the existing user, preferably regarding at least the current communication session.

Preferably, the voiceprints have been arranged in the same order in the concatenated voiceprint as the cues were presented or voice responses were included in the concatenated sound data. This common order may correspond to the original representation order of cues (i.e. from first to last, e.g. left-to-right or top-to-bottom if simultaneously visualized on a display or shown/indicated one at a time as a temporal sequence).

In some embodiments, it is assumed that the user utters the responses to the cues in one go in the order of the cues keeping e.g. a pause (silence) exceeding an indicated minimum length (e.g. about one or two seconds) between the responses. The system may then utilize the obtained collective sample including all the responses as such for the matching (e.g. feature vectors may be extracted from the collective sample directly) or first edit the sample by deleting the silent portions therefrom, for example. Alternatively, the system may be configured to initially store the responses separately or separate them from the obtained common sample to check their ordering relative to the cues, for instance, and/or to subject them to independent analysis. In some embodiments, the system may indeed be configured to analyze the responses given to mutually first arrange the voiceprints and responses in the same order for the concatenated versions prior to performing more thorough matching and determination of the final outcome for the speaker verification. More coarse comparison methods may be utilized for such sorting purposes than used in the actual verification.

Further preferably, the aforesaid, dynamically selected (e.g. randomly or pseudo-randomly selected), subset contains two or more cues. Most preferably, however, not all the cues having a voiceprint of the claimed user associated therewith are included in the subset.

In some embodiments, the sound data may be received from a mobile (terminal) device. The mobile device advantageously incorporates at least one integral or separate/removable (e.g. wiredly or wirelessly connected) microphone for capturing voice and encoding it into digital format, more advantageously at least one air microphone and at least one contact microphone. Preferably, the system maintains or has access to information linking service/application users, or user id's, and mobile devices or mobile identities, e.g. IMEI code or IMSI code (or other smart card), respectively, together. Optionally, mobile phone number could be utilized for the purpose.

Optionally, the cues are at least indicated to the user via a first terminal device such as a laptop or desktop computer. Service data in general and/or the cues may be provided as browser data such as web page data. Preferably such first terminal device includes or is at least connected to a display, a projector and/or a loudspeaker with necessary digital-to-analogue conversion means for the purpose.

Optionally, the sound data is obtained via a second terminal device, preferably via the aforementioned mobile device like a cellular phone, typically a smartphone, or a communications-enabled PDA/tablet, configured to capture the sound signal incorporating the user's voice (uttering the response to the cues) and convert it into digital sound data forwarded towards the system.

In some embodiments, the mobile device may be provided with a message, such as an SMS message, triggered by the system in order to verify that the user requiring voice-based authentication has the mobile device with him/her. For example, the user may have logged in an electronic service using certain user id that is associated with the mobile device. Such association may be dynamically controlled in the service settings by the user, for instance. In response to the message, the user has to trigger sending a reply, optionally via the same mobile device or via the first terminal, optionally provided with a secret such as password, or other acknowledgement linkable by the system with the user (id).

In some embodiments, the cues may be represented visually and/or audibly utilizing e.g. a web browser at the first user terminal. Preferably, but not necessarily, the user provides the response using the second terminal such as a mobile terminal. The first terminal may refer to e.g. a desktop or laptop computer that may be personal or in a wider use. The second terminal, particularly if being a mobile terminal such as a smartphone, is typically a personal device associated with a certain user only, or at least rather limited group of users.

The system may be configured to link or associate the first and second terminals together relative to the ongoing session and authentication task. As a result, actions taken utilizing the second terminal may be linked with activity or response at the first terminal, e.g. browser thereat, by the system.

For example, the system may be configured to dynamically allocate a temporary id such as a so-called session id to the first terminal. This id may comprise a socket id. The first terminal may then be configured to indicate the id to the user and/or second terminal. For example, visual optionally coded representation, applying a matrix like QR (Quick Response)™ code, preferably including also other information such as user id (to the service) and/or domain information may be utilized. The second terminal may be then configured to wirelessly obtain the id. Preferably, the second terminal may read or scan, e.g. via camera and associated code reader software, the visual representation and decode it. Preferably the same application, e.g. Java™ application, which is applied for receiving voice input from the user, is utilized for delivering the obtained id back towards the system, which then associates the two terminals and the session running in the first terminal (via the browser) together.

In some embodiments, the determination tasks may include a number of mapping, feature extraction, and/or comparison actions according to predetermined logic by which the match between the obtained sound data and existing voiceprint data relative to the indicated existing user is confirmed, i.e. the authentication is considered successful in the light of such voice-based authentication factor. In the case of no match, i.e. failed voice-related authentication, the authentication status may remain as is or be lowered (or access completely denied).

In some embodiments, elevating the gained current authentication status in connection with successful voice-based speaker (user) verification may include at least one action selected from the group consisting of: enabling service access, enabling a new service feature, enabling the use of a new application, enabling a new communication method, and enabling the (user) adjustment of service settings or preferences.

In some embodiments, a visual cue defines a graphical image that is rendered on a display device for perception and visual inspection by the user. The image may define or comprise a graphical pattern, drawing or e.g. a digital photograph. Preferably, the image is complex enough so that the related (voice) association the user has, bears also necessary complexity and/or length in view of sound data analysis (too short or too simple voice input/voiceprint renders making reliable determinations difficult).

In some embodiments, audiovisual cue includes a video clip or video file with associated integral or separate sound file(s). Alternatively or additionally, audiovisual cue may incorporate at least one graphical image and related sound.

Generally, video and audiovisual cues are indicated by e.g. a screenshot or other descriptive graphical image, and/or text, shown in the service UI. The image or a dedicated UI feature (e.g. button symbol) may be then utilized to activate the video playback by the user through clicking or otherwise selecting the image/feature, for instance. Alternatively, e.g. video cue(s) may playback automatically, optionally repeatedly.

In some embodiments, the audio cue includes sound typically in a form of at least one sound file that may be e.g. monophonic or stereophonic. The sound may represent music, sound scenery or landscape (e.g. jungle sounds, waterfall, city or traffic sounds, etc.), various noises or e.g. speech.

Audio cue may, despite of its non-graphical/invisible nature, still be associated with an image represented via the service UI. The image used to indicate an audio cue is preferably at least substantially the same (i.e. non-unique) with all audio cues, but anyhow enables visualizing an audio cue in the UI among e.g. visual or audiovisual cues, the cues being optionally rendered as a horizontal sequence of images (typically one image per cue), of the overall challenge. As with video or audiovisual cues, the image may be active and selecting, or 'clicking' it, advantageously then triggers the audible reproduction of the cue.

Alternatively or additionally, a common UI feature such as icon may be provided to trigger sequential reproduction of all audio and optionally audiovisual, cues.

In some embodiments and in the light of foregoing, basically all the cues may be indicated in a (horizontal) row or column, or using other configuration, via the service UI.

Visually distinguishable, clear ordering of the cues is advantageous as the user may immediately realize also the corresponding, correct order of corresponding cue-specific (sub-)responses in his/her overall voice response.

Video, audiovisual and/or audio cues may at least have a representative, generic or characterizing, graphical image associated with them as discussed above, while graphical (image) cues are preferably shown as such.

In some embodiments, at least one cue is selected or provided, optionally created, by the user himself/herself. A plurality of predetermined cues may be offered by the system to the user for review via the service UI wherefrom the user may select one or more suitable, e.g. the most memorable, cues to be associated with voiceprints. Preferably, a plurality of cues is associated with each user.

A voiceprint, i.e. a voice-based fingerprint, may be determined for a cue based on a user's sound, or specifically voice, sample recorded and audibly exhibiting the user's association (preferably brainworm) relating to each particular cue. A voiceprint of the present invention thus advantageously characterizes, or is used to characterize, both the user (utterer) and the spoken message (the cue or substantive personal association with the cue) itself. Recording may be effectuated using the audio input features available in a terminal device such as microphone, analogue-to-digital conversion means, encoder, etc.

With different users, a number of same or similar cues may be generally utilized. Obviously, the voiceprints associated with them are and shall be personal.

In some embodiments, the established service connection (access) is maintained based on a number of security measures the outcome of which is used to determine the future of the service connection, i.e. let it remain, terminate it, or change it, for example. In some scenarios, fingerprint methodology may be applied. A user terminal may initially, upon service log-in, for instance, provide a (conceptual) fingerprint based on a number of predetermined elements, such as browser data such as version data, OS data such as version data, obtained Java entity data such as version data, and/or obtained executable data such as version data. Version data may include ID data such as version identifier or generally the identifier (application or software name, for example) of the associated element. The arrangement may be configured to request new fingerprint in response to an event such as a timer or other temporal event (timed requests, e.g. on a regular basis). Alternatively or additionally, the client may provide fingerprints independently based on timer and/or some other event, for instance.

In response to the received new fingerprint, the arrangement may utilize the most recent fingerprint and a number of earlier fingerprints, e.g. the initial one, in a procedure such as a comparison procedure. The procedure may be executed to determine the validity of the current access (user). For example, if the compared fingerprints match, a positive outcome may be determined indicating no increased security risk and the connection may remain as is. A mismatch may trigger a further security procedure or terminating the connection.

In some embodiments, the system is location-aware advantageously in a sense it utilizes explicit or implicit location information, or indication of location, to authenticate the user. The location information may be absolute (e.g. coordinates), relative (e.g. with respect to some other location such as "50 meters west/away from compound X"), and/or contextual (e.g. work, home, club, bowling center, base station, warehouse, gate A, door B). A number of predetermined allowed and/or non-allowed/blocked locations may be associated with each user of the arrangement. For example, the location may refer to at least one element selected from the group consisting of: address, network address, sub-network, IP (Internet Protocol) address, IP sub-network, cell, cell-ID, street address, building or estate, access control terminal, access controlled physical resource, one or more coordinates, GPS coordinates, GLONASS coordinates, district, town, country, continent, distance to a predetermined location, maximum range from a predetermined location, and direction from a predetermined location. Each of the aforesaid addresses may further refer to an address range. The location information may be at least partially gathered based on data obtained from a user terminal, e.g. mobile terminal.

Accordingly, the estimated location of the user, based on the information obtained and indicative of the location of the user (or of an associated user terminal), may be utilized as additional authentication factor. In some embodiments, the information may indicate e.g. a base station currently used by the terminal. In some embodiments, the information may indicate or identify e.g. an access control terminal, other access control device and/or authentication device via which an access request or other user, or user device, input has been received. As the locations of such network, authentication or access control elements are known, also the location of the user may be estimated (deemed substantially same, for example). In some embodiments, the location information may indicate e.g. certain building or estate (e.g. via name or other ID). The user may have been detected, in addition to or instead of related access control data, based on e.g. camera data or other surveillance data, for instance.

Failed location-based authentication may result in a failed overall authentication (denied access), or alternatively, a limited functionality such as limited access to the service may be provided. The same applies to potential other authentication factors. Each authentication factor may be associated with a characterizing weight (effect) in the authentication process.

In some embodiments, the system may be configured to transmit a code, preferably as browser data such as web page data, during a communication session associated with a predetermined user of the service for visualization and subsequent input by the user. Further, the system may be configured to receive data indicative of the inputted code and of the location of the terminal device applied for transmitting the data, determine on the basis of the data and predetermined locations associated with the user whether the user currently is in allowed location, and provided that this seems to be the case on the basis of the data, raise the gained authentication status of the user regarding at least the current communication session. Preferably the data is received from a mobile (terminal) device. Optionally, the code is indicated to the user via a first terminal device such as a laptop or desktop computer. Instead of a code dedicated for the purpose, e.g. the aforesaid temporary id such as socket id may be utilized in this context as well.

A certain location may be associated with a certain user by "knowing" the user, which may refer to optionally automatically profiling and learning the user via monitoring one's habits such as location and optionally movements. As a result, a number of common, or allowed, locations may be determined and subsequently utilized for authentication purposes. Additionally or alternatively, the user may manually register a number of allowed locations for utilizing the solution in the arrangement. Generally, in various embodiments of the present invention, knowing the user and/or his/her gear and utilizing the related information such as location information in connection with access control, conducting automated attacks such as different dictionary attacks against the service may be made more futile.

In some scenarios, the location of the user (terminal) and/or data route may be estimated, e.g. by the system, based on transit delay and/or round-trip delay. For example, delays relating to data packets may be compared with delays associated with a number of e.g. location-wise known references such as reference network nodes, which may include routers, servers, switches, firewalls, terminals, etc.

Yet in a further, either supplementary or alternative embodiment, the electronic service is a cloud service (running in a cloud). Additionally or alternatively, the service may arrange virtual desktop and/or remote desktop to the user, for instance.

In another aspect, an electronic device for authenticating a person, comprises a voiceprint repository configured to store, for a number of users including at least one user, a plurality of personal voiceprints, each of which being linked with a dedicated visual, audiovisual or audio cue, for challenge-response authentication, the cues being user-selected, user-provided or user-created, an authentication entity configured to pick, upon receipt of an authentication request associated with a claim of an identity of an existing user of said number of users, a subset of cues for which there are voiceprints of the existing user stored, and represent the cues in the subset to the person as a challenge, and a response provision means for obtaining sound data indicative of the voice responses uttered by the person to the represented cues, said means comprising an air microphone and a contact microphone optionally integrated in a common microphone apparatus preferably removably connected to the electronic device directly (e.g. via connector), via a connecting cable or wirelessly, whereupon the authentication entity is configured to determine, on the basis of the sound data, the represented cues and voiceprints linked therewith and the existing user, whether the response has been uttered by the existing user of said number of users, wherein the sound data indicative of the voice responses uttered to the represented cues are preferably matched as concatenated against a concatenated voiceprint established based on the voiceprints linked with the represented cues and the existing user, and provided that this seems to be the case, to elevate the authentication status of the person as the existing user.

In a further aspect, a method for authenticating a subject person to be executed by one or more electronic devices, comprising storing, for a number of users, a plurality of personal voiceprints each of which linked with a dedicated visual, audiovisual or audio cue, for challenge-response authentication of the users, cues being user-selected, user-provided or user-created, picking, upon receipt of an authentication request associated with a claim of an identity of an existing user of said number of users, a subset of cues for which there are voiceprints of the existing user stored, to be represented as a challenge, receiving a response incorporating sound data indicative of the voice responses uttered by the person to the represented cues and captured utilizing an air microphone and a contact microphone, determining on the basis of the sound data, the represented cues and voiceprints linked therewith and the existing user, whether the response has been uttered by the existing user, wherein the sound data indicative of the voice responses uttered to the represented cues are preferably matched as concatenated against a concatenated voiceprint established based on the voiceprints linked with the represented cues and the existing user, and provided that this seems to be the case, elevating the authentication status of the person acknowledged as the existing user according to the determination, whereupon e.g. a responsive access control action may be executed.

Preferably, the voice responses are captured using at least a throat microphone. Alternatively or additionally, air/mouth microphone(s) could be used. For example, signals from throat and mouth microphones could be combined to obtain authentic signal including both stop consonants and e.g. sounds established at the nasal cavity or by tongue or lips, which are sounds that can be harder to capture with throat microphones. The microphone may be wiredly or wirelessly connected to a terminal device.

In some system, method and device embodiments as alluded to hereinbefore and also as an independent asset fully separate therefrom, a multi-microphone such as a dual microphone apparatus may be provided to transform the speech of a user into electrical form. The dual microphone apparatus may incorporate a first microphone comprising an air microphone for receiving pressure waves emitted from the mouth of the user and converting them into an electrical first signal, a second microphone comprising a contact microphone to be arranged in skin contact with the user to receive vibration conveyed via the skin tissue and converting it into an electrical second signal, and a connection unit for supplying the first and second signals to an external device, such as the aforesaid electronic device, first terminal, second terminal or generally a terminal device, as separate signals or as a common signal established based on the first and second signals via wired or wireless transmission path, optionally via electrical conductors or radio interface, respectively.

In some embodiments, the air microphone may comprise a close-speaking microphone.

In some embodiments, the contact microphone may comprise a throat microphone.

In some embodiments, the connection unit may be configured to establish a multi-channel signal, optionally stereo signal, wherein for each microphone there is preferably a dedicated channel allocated.

In some embodiments, the first and second signals may be combined or translated into a common signal that is indicative of the pressures waves and vibration captured by the first and second microphones, respectively.

In some embodiments, a headset device comprising the dual-microphone apparatus and at least one ear speaker, preferably comprising an ear pad speaker with a head band or an ear-fitting headphone. Optionally multi-speaker headphone may be included.

The contact microphone and/or air microphone may be in some embodiments utilized for capturing biometric or health data regarding the user. From either or both microphone signals, e.g. health data indicative of the status or condition of the user may be derived either by the apparatus or e.g. a functionally connected remote entity, such as a network server. In these embodiments, the microphone sensors may be specifically configured to capture desired biometric/health information (e.g. pulse or respiration data) instead of or in addition to e.g. speech. The apparatus may contain a number of additional or alternative sensors for obtaining biometric/health data. Also from the speech signal, selected biometric/health data may derived (e.g. flu condition could be detected based on a nasal voice).

In some embodiments, the connection unit is configured to apply a public key associated with a second (remote) party, such as a second (remote) user of a remote terminal device, for encrypting the first and/or second signals, or e.g. a common signal based thereon to be transmitted via a local terminal device of a first (local) user at least functionally connected to the connection unit to the remote terminal and related connection unit of the second user for subsequent decryption and potential audible reproduction. Alternatively, the public key may be utilized to cipher the transfer of e.g. session-specific encryption key for the signal(s).

Likewise, the unit is configured to store a private key for the first user to decrypt incoming encrypted audio signal(s) for audible reproduction preferably via the at least one speaker.

Correspondingly, a connection unit of the remote terminal may in a similar fashion apply the public key associated with the first user for encrypting the signal(s), or e.g. session-specific encryption key for the signal(s), transmitted therefrom via the remote terminal to the local terminal and associated connection unit for local decryption and potential audible reproduction.

Preferably, the private keys are stored as encrypted in the connection units, whereupon their utilization further preferably requires using a password. The password may be transferred to a connection unit via the associated terminal responsive to successful user authentication preferably at least selectively utilizing the techniques of audiovisual associative authentication described herein.

The previously presented considerations concerning the various embodiments of the system may be flexibly applied to the embodiments of the device or method mutatis mutandis, and vice versa, as being appreciated by a skilled person.

The utility of the present invention follows from a plurality of issues depending on each particular embodiment. Cleverly, the associative memory of users and also a phenomenon relating to a memory concept often referred to as brainworms, or earworms, regarding things and related associations one seems to remember, basically reluctantly but still with ease (e.g. songs that are stuck inside one's mind/one cannot get out of his/her head), can be harnessed into utilization in the context of authentication together with voice recognition, referring especially to speaker verification in this case (claimed identity verification). One rather fundamental biometric property, i.e. voice, is indeed exploited as an authentication factor together with features of speech (i.e. voice input message content) recognition. The security risks arising from e.g. spoofing type attacks such as spoofing by imitation in which an attacker could use e.g. recorded speech or speech vocoder imitating the speech of the target person may be reduced as the subset of cues used as a challenge, or 'prompt', for receiving the corresponding voice responses from a speaker can be dynamically, e.g. randomly or pseudo-randomly, selected (including determining the number of cues, the cues themselves, and the order of cues) upon each verification round. Also other factors, e.g. location data indicative of the location of the user (terminal), may be applied for authentication purposes.

Rather regularly people manage to associate different things like sounds, images, videos, etc. together autonomously or automatically and recall such, potentially complex and/or lengthy (advantageous properties in connection with authentication particularly if the related voice inputs and fingerprints exhibit similar characteristics in conjunction with the present invention) association easily after many years, even if the association as such was originally subconscious or at some occasions even undesired as the person in question sees it. By the present solution, device and/or service users may be provided with authentication challenge as a number of cues such as images, videos and/or sounds for which they will themselves initially determine the correct response they want to utilize in the future during authentication. Instead of hard-to-remember numerical or character based code strings, the user may simply associate each challenge with a first associative, personal response that comes into mind and apply that memory image in the forthcoming authentication events based on voice recognition, as for each cue a voiceprint is recorded indicative of correct response, whereupon the user is required to repeat the voice response upon authentication when the cue is represented to him/her as a challenge.

In various embodiments of the present invention, audio responses provided to the indicated cues are preferably concatenated to construct a temporally longer response that is then compared with a collective voiceprint that is also formed by combining, or 'concatenating', the voiceprints of the individual cues provided in the challenge. Accordingly, the reliability of the speaker verification action may be elevated in contrast to e.g. separate comparisons between the voiceprints behind the cues and the given responses. Rather often individual brainworm-type associations really are relatively compact, i.e. a word or sentence that is associated with a cue is short or shortish, even shorter than one second in duration, so that it is pleasantly easy to remember and utter, whereupon utilizing several voiceprints and responses associated with them together, in a linked or 'concatenated' manner, may turn out beneficial to obtain enough data in view of a single matching procedure.

In practice, each voiceprint incorporates a model, template, feature vector(s), and/or other data capturing the characteristics of the training data (enrollment data) provided by a user for the particular cue. During subsequent testing phase, the person claiming the identity of that user is supposed to provide the same input, meaning repeating the same word or sentence using the same voice as was done during the training. Recording parameters such as conditions do change (used equipment/microphone, background/environmental noise, changed physiological voice characteristics due to illness, aging, natural fluctuations and inaccuracies in human voice production, etc.) but these may be compensated by using appropriate e.g. contemporary normalization and possible other techniques. The model/voiceprint type approach taken into use here thus involves aspects of text-dependent speaker verification as the lexicons in the enrollment and testing phases correspond to each other, and the speaker the identity of which is to be verified is assumed as a cooperative person who, by default, tries to repeat the same words or sentences during the testing phase as was uttered during the training phase for the same cue.

Further, it has been found that with many terminals or generally air/mouth/close-speaking microphones especially stop consonants are problematic in view of the sound analysis such as speaker verification as their subtle features potentially facilitating voiceprint generation (i.e. enrollment in the terminology of speaker verification) and subsequent detection (i.e. testing phase) particularly when the sound samples are short, typically only one uttered word per cue, are lost in the conversion process. Also background noise possibly present in the use scenarios of the present invention may render acquiring reliable sound data for voiceprint generation or matching difficult and force using complex noise cancellation solutions. Accordingly, the use of throat microphones, or potentially other type of contact microphones to be provided against a solid vibration medium, provides supplementary or alternative technique to tackle with the problem. The throat microphone captures vibrations from a throat of the wearer by transducers contacting his/her neck.

Yet, a technically feasible, security enhancing procedure is offered for linking a number of terminals together from the standpoint of electronic service, related authentication and ongoing session.

Still, electronic devices such as computers and mobile terminals may be cultivated with the suggested, optionally self-contained, authentication technology that enables authentication on operating system level, which is basically hardware manufacturer independent. The outcome of an authentication procedure may be mapped into a corresponding resource or feature (access) control action in the device. Generally, (further) overall access to the device resources (e.g. graphical UI and/or operating system) or access to specific application(s) or application feature(s) may be controlled by the authentication procedure, which may be also considered as a next or new generation password mechanism, identity based solution. Indeed, the suggested authentication technology may be utilized to supplement or replace the traditional 'PIN' type numeric or character code based authentication/access control methods.

Further, the suggested solution may be applied to various access control devices and solutions in connection with, for example, gates, doors, containers, safes, diaries, or locking/unlocking mechanisms in general.

Reverting to voice capturing, both air microphone and contact microphone may indeed be simultaneously and collectively applied to provide higher quality (e.g. more authentic, comprehensive and/or less noisy) electrical and preferably specifically digital sound signal than being possible with either microphone technology if used in isolation.

The microphone signals complement each other and enable constructing a common signal or a corresponding representation of the originally provided voice responses, which is more comprehensive and characterizing than a single air microphone signal or throat microphone signal.

A contact microphone such as a throat microphone may be superior in detecting e.g. stop consonants in contrast to an air microphone. In any case, contact microphone is relative unsensitive to ambient noise. On the other hand, e.g. nasal cavity-based or lips/tongue-based sounds are usually captured more authentically using air microphones. However, air microphones also capture ambient noise very effectively. A combined solution and e.g. common signal adopting features from both air and contact microphone signals may be made somewhat noise free while representing the different characteristics of the original speech particularly well.

In some embodiments, e.g. contact microphone signal may be utilized for voice activity detection (VAD) in addition or instead of producing an authentic speech signal. Detection may be based e.g. on signal amplitude/magnitude and/or power. Accordingly, durations that are quiet in the contact microphone signal, may be also filtered out from the air microphone signal as there is good likelihood the durations have consisted of mainly background/ambient noise captured by the air microphone.

In some embodiments, the suggested authentication procedure may be applied in serving e.g. a password, passcode or similar access data for using a private key preferably stored external to a terminal device, e.g. in a connection unit of the suggested microphone apparatus, so that speech can be transferred as encrypted between communicating parties, also over terminals until the actual microphone apparatus and then decrypted. This adds to communication security as the speech remains encrypted also within the terminal (encrypted prior to the terminal at the sending end and decrypted after the terminal at the receiving end) not only on the transmission path or merely air interface between the communicating terminals. The solution thus associates encryption (decryption) circuit, or generally encryption/decryption feature, biometrically with a certain user, i.e. person.

In some embodiments, the suggested authentication procedure, which is executed via a user terminal upon accessing a physical resource, such as a door or gate, may provide additional level of security even if the physical resource is provided with own (preferably still hermetically isolated as described hereinlater, relative to the environment outside the access-controlled area) authentication and access control features.

The expression "a number of" refers herein to any positive integer starting from one (1), e.g. to one, two, or three.

The expression "a plurality of" refers herein to any positive integer starting from two (2), e.g. to two, three, or four.

The expression "data transfer" may refer to transmitting data, receiving data, or both, depending on the role(s) of a particular entity under analysis relative a data transfer action, i.e. a role of a sender, a role of a recipient, or both.

The terms "electronic service" and "electronic application" are herein utilized interchangeably.

The terms "a" and "an" do not denote a limitation of quantity, but denote the presence of at least one of the referenced item.

The terms "first" and "second" do not denote any order, quantity, or importance, but rather are used to distinguish one element from another.

Different embodiments of the present invention are disclosed in the dependent claims.

BRIEF DESCRIPTION OF THE RELATED DRAWINGS

Next the invention is described in more detail with reference to the appended drawings in which FIG. 1a illustrates the concept of an embodiment of the present invention via both block and signaling diagram approaches relative to an embodiment thereof.

DETAILED DESCRIPTION

Figure 1A:
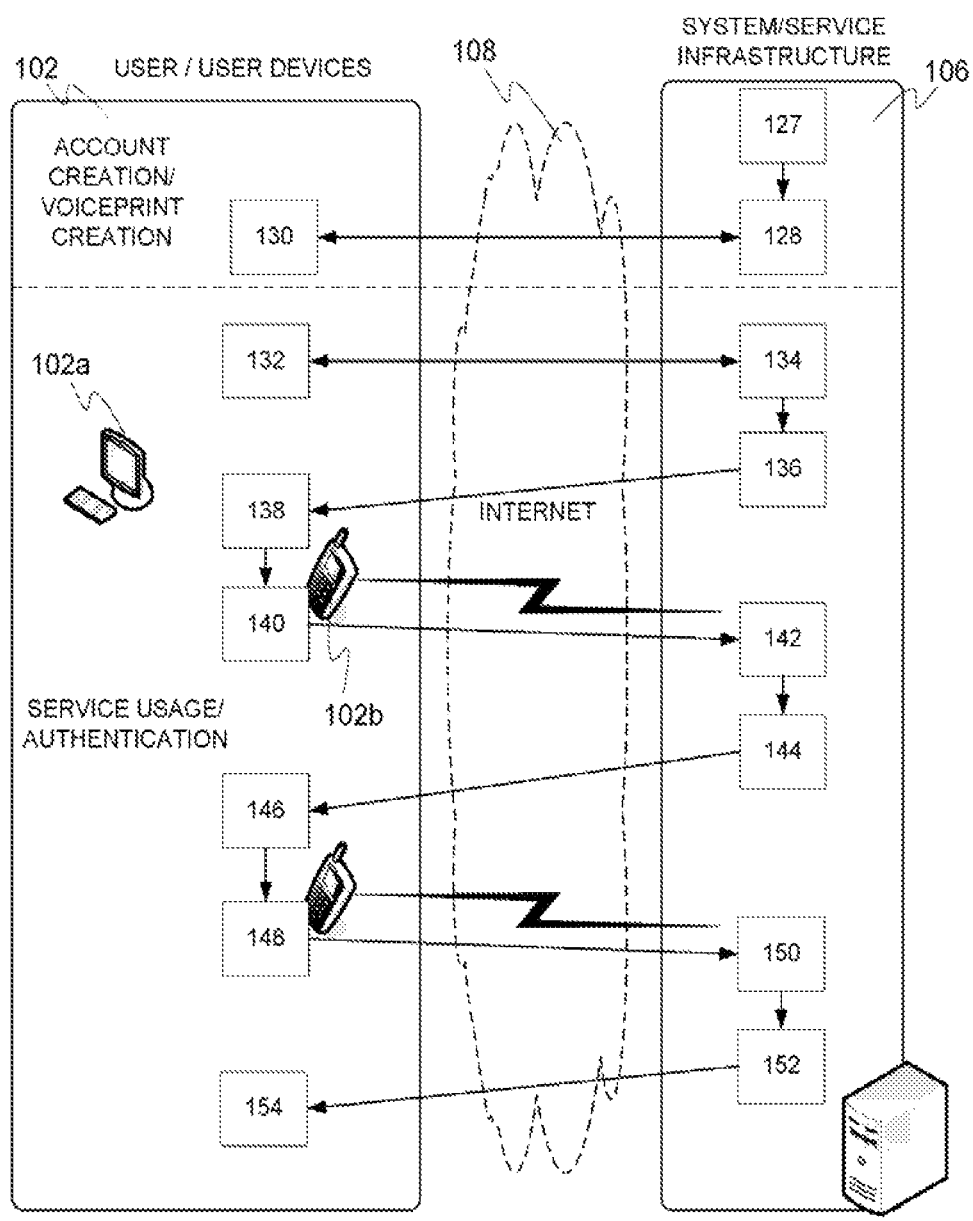
FIG. 1b is a block diagram representing an embodiment of selected internals of the system or device according to the present invention.
FIG. 1c illustrates scenarios involving embodiments of an electronic device in accordance with the present invention.
FIG. 1d illustrates an embodiment of analyzer in accordance with the present invention for use in speaker verification.

FIG. 1a illustrates an embodiment of the present invention. The embodiment may be generally related, by way of example only, to the provision of a network-based or particularly online type electronic service such as a virtual desktop service or document delivery service, e.g. delivery of a bill optionally including a notice of maturity regarding a bank loan. Entity 102 refers to a service user (recipient) and associated terminal devices such as a desktop or laptop computer 102a and/or a mobile device 102b utilized for accessing the service in the role of a client, for instance. The device(s) preferably provide access to a network 108 such as the Internet. The mobile device, such as a mobile phone (e.g. a smartphone) or a PDA (personal digital assistant) may preferably be wirelessly connected to a compatible network, such as a cellular network. Preferably the Internet may be accessed via the mobile device as well. The terminal device(s) may comprise a browser. Entity 106 refers to a system or network arrangement of a number of at least functionally connected devices such as servers. The communication between the entities 102 and 106 may take place over the Internet and underlying technologies, for example. Preferably the entity 106 is functionally also connected to a mobile network.

Indeed, in the context of the shown embodiment of the present invention, the user 102 is preferably associated with a first terminal device 102a such as a desktop or laptop computer, a thin-client or a tablet/hand-held computer provided with network 108 access, typically Internet access. Yet, the user 102 preferably has a second terminal 102b such as a mobile communications device with him/her, advantageously being a smartphone or a corresponding device with applicable mobile subscription or other wireless connectivity enabling the device to transfer data e.g. between local applications and the Internet. Many contemporary and forthcoming higher end mobile terminals qualifying as smartphones bear necessary capabilities for both e-mail and web surfing purposes among various other sophisticated features including e.g. camera with optional optical code, e.g. QR™ or other matrix code, reader application. In most cases, such devices support a plurality of wireless communication technologies such as cellular and wireless local area network (WLAN) type technologies. A number of different, usually downloadable or carrier provided, such as memory card provided, software solutions, e.g. client applications, may be run on these 'smart' terminal devices.

The potential users of the provided system include different network service providers, operators, cloud operators, virtual and/or remote desktop service providers, application/software manufacturers, financial institutions, companies, and individuals in the role of a service provider, intermediate entity, or end user, for example. The invention is thus generally applicable in a wide variety of different use scenarios and applications.

In some embodiments the service 106 may include customer portal service and the service data may correspondingly include customer portal data. Through the portal, the user 102 may inspect the available general data, company or other organization-related data or personal data such as data about rental assets, estate or other targets. Service access in general, and the access of certain features or sections thereof, may require authentication. Multi-level authentication may be supported such that each level can be mapped to predetermined user rights regarding the service features. The rights may define the authentication level and optionally also user-specific rules for service usage and thereby allow feature usage, exclude feature usage, or limit the feature usage (e.g. allow related data inspection but prevent data manipulation), for instance.

Initially, at 127 the system 106 may be ramped up and configured to offer predetermined service to the users, which may also include creation of user accounts, definition of related user rights, and provision of necessary authentication mechanism(s). Then, the user 102 may execute necessary registration procedures via his/her terminal(s) and establish a service user account cultivated with mandatory or optional information such as user id, service password, e-mail address, personal terminal identification data (e.g. mobile phone number, IMEI code, IMSI code), and especially voiceprints in the light of the present invention. This obviously bi-directional information transfer between the user/user device(s) 102 and the system/service 106, requiring performing related activities at both end, is indicated by items 128, 130 in the figure.

Figure 2A:
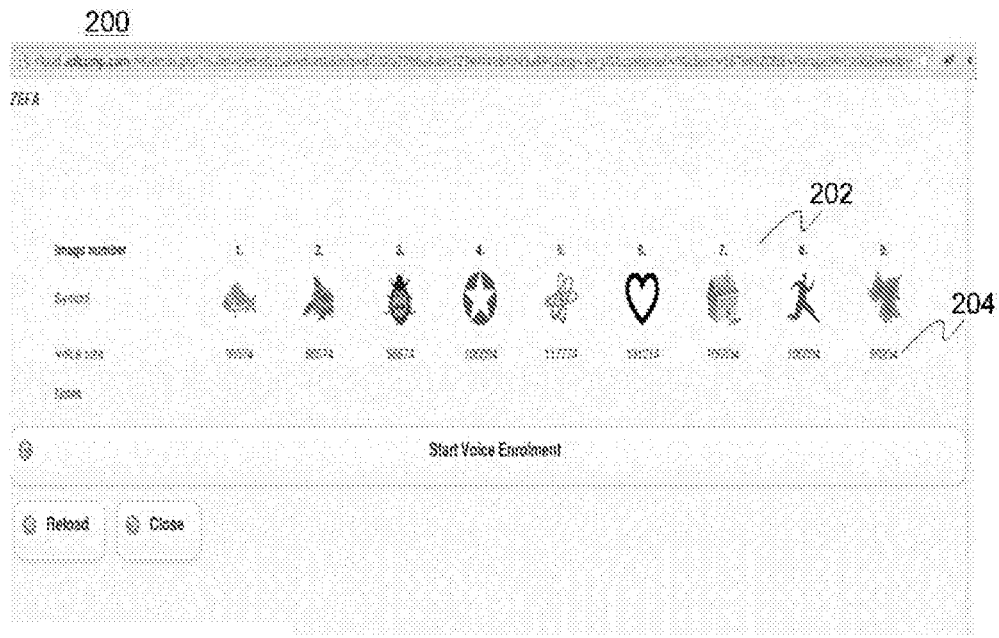
FIG. 2a represents one example of service or device UI view in connection with user authentication.

FIG. 2a visualizes the voiceprint creation in the light of possible related user experience. A number of potential cues, such as graphical elements, 202 may be first indicated to the user via the service or device (mutatis mutandis) UI 200. These suggested cues may be selected, e.g. randomly or pseudo-randomly, from a larger group of available preset cues by the system. Advantageously, the user naturally links at least some cues with certain associations based on e.g. his/her memories and potentially brainworms so that the association is easy to recall and preferably unambiguous (only one association per cue; for example, upon seeing a graphical representation of a cruise ship, the user always come up with memory relating to a trip to Caribbean, whereupon the natural association is 'Caribbean', which is then that user's voice response to the cue of a cruise ship).

Further information 204 such as the size of a captured sound file may also be shown. The user may optionally select a subset of all the indicated cues and/or provide (upload) cues of his/her own to the system for use during authentication in the future. There is preferably a minimum size defined for the subset, i.e. number of cues, each user should be associated with. That could be three, five, six, nine, ten, or twelve cues, for example. Further, the sound sample to be used for creating the voiceprint, and/or as at least part of a voiceprint, may be defined a minimum acceptable duration in terms of e.g. seconds and/or tenths of seconds.

As mentioned hereinearlier, the cues may be visual, audible, or a combination of both. Regarding the user associated cues, the user may then input, typically utter, his/her voice response based on which the system determines the voiceprints, preferably at least one dedicated voiceprint corresponding to each cue in the subset.

In some embodiments, the training or 'enrollment' phase during which a voiceprint is generated based on a user's voice input to the cue he/she selected may comprise repeated uttering of the basically same (but in practice always more or less fluctuating due to the nature of human speech production mechanisms and e.g. environmental issues) input for a predetermined number of times having regard to a single cue and/or until the used other input criteria are met. Based on such repeated input, a common voiceprint associated with the cue may be established using predefined combination logic. The logic may incorporate averaging and/or other type of merging of features extracted from different instances of the repeated input.

A voiceprint associated with a cue preferably characterizes both the voice and the spoken sound, or message (semantic meaning of the input voice), of the captured voice input used for establishing it. In other words, same message later uttered by other user does not match with the voiceprint of the first user during the voice authentication phase even though the first user uttered the very same message to establish the fingerprint. On the other hand, a message uttered by the first user does not match the voiceprint established based on other message uttered by the first user.

For voice characterization to be used in establishing the voiceprints, the system may be configured to extract a number of features describing the properties of the user's vocal tract, for example, and e.g. related formant frequencies from the voice input. Such frequencies typically indicate the personal resonance frequencies of the vocal tract of the speaker.

Next, reverting to FIG. 1a and switching over (indicated by the broken line in the figure) to a scenario in which the user has already set up a service account and wishes to authenticate to reach desired authentication status within the service 106 (in terms of speaker verification, one could say the execution switches over to testing phase from enrollment), at 132 the user 102 may trigger the browser in the (first) terminal and control it to connect to the target electronic service 106. Accordingly, the user may now log into the service 106 using his/her service credentials or provide at least some means of identification thereto as indicated by items 132, 134.

The system managing the service 106 may comprise e.g. a Node.js™ or corresponding runtime environment server entity whereto/relative to which the web browser registers itself, whereupon the service side allocates a dynamic id such as a socket id or other session id and delivers it at 136 to the browser that indicates the id and optionally other information such as domain, user id/name, etc. to the user via a display at item 138.

Figure 2B:
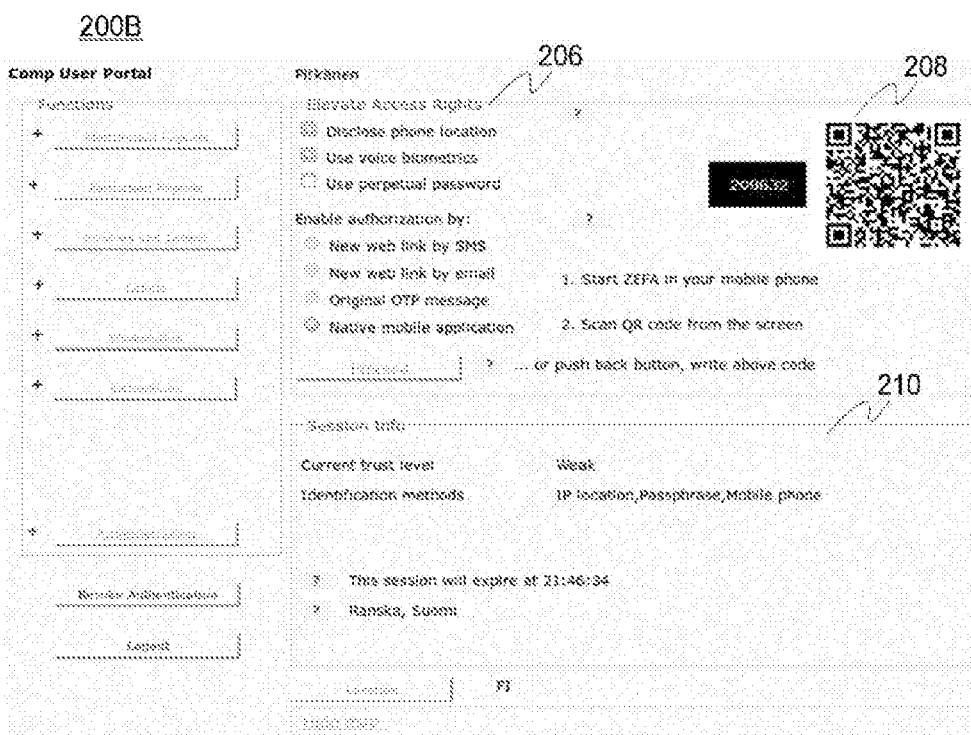
FIG. 2b represents a further example of service or device UI view in connection with user authentication.

FIG. 2b illustrates an embodiment of potential service or device UI features at this stage through a snapshot of UI view 200B. The dynamic id is shown both as a numeric code and as embedded in a matrix type QR code at 208 to the user. Items 206 indicate the available authentication elements or factors, whereas data at 210 implies the current authentication level of the session with related information. Instead of QR code, some other matrix barcode or completely different visual representation could be utilized.

With reference to FIG. 1a again, at 140 the code is read by using a camera-based code reader application, for instance, to the second terminal such as mobile terminal of the user. Then the mobile device is configured, using the same or other predetermined application, to transfer an indication of the obtained data such as dynamic id and data identifying the terminal or entity such as smart card therein, to the system 106, wherein a target entity such as socket.io entity that is configured to operate as a (browser type) client to the Node.js server entity, forwards at least part of the data, including the dynamic id, to the Node.js server entity that can thus dynamically link, and preferably shall link, the particular first and second terminals to the same ongoing service (authentication) session at 142. Also the subsequent data transfer activities, e.g. transfer of voice response, from the second terminal to the system may be at least partially implemented utilizing the same route and related technique(s). Different entities on the system side may be, in practical circumstances, be implemented by one or more physical devices such as servers. For example, a predetermined server device may implement the Node.js™ server whereas one other server device may implement the socket.io™ or corresponding client entity for real-time web applications.

Next, at 144 the system 106 fetches a number (potentially dynamically changing according to predetermined logic) of cues associated with the user account initially indicated/used in the session and for which voiceprints are available. The cues may be basically randomly selected (and order-wise also randomly represented to the user). The cues are indicated (transferred) to the browser in the terminal that then represents them to the user at 146 e.g. via a display and/or audio reproduction means depending on the nature of the cues. E.g. Ajax™ (Asynchronous JavaScript and XML) and PHP (Hypertext Preprocessor) may be utilized for terminal side browser control. Mutually the cues may be of the same or mixed type (e.g. one graphical image cue, one audio cue, and one video cue optionally with audio track).

Figure 2C:
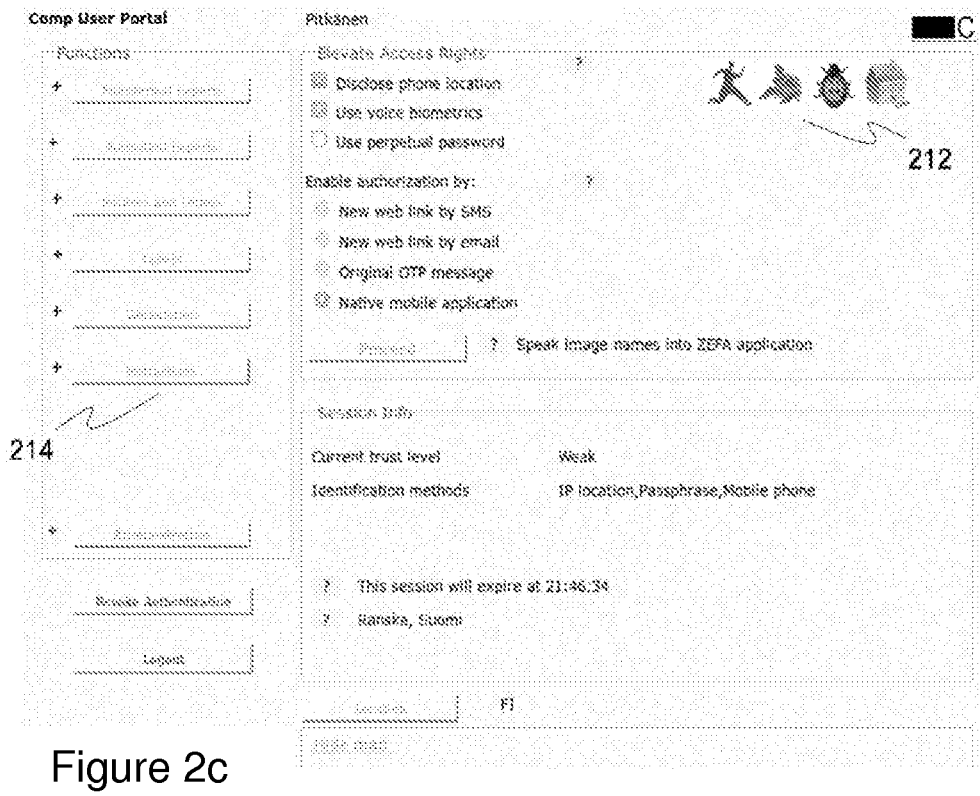
FIG. 2c represents further example of service or device UI view in connection with user authentication.

As the user 102 perceives the cues as an authentication challenge, he/she provides the voice response preferably via the second terminal at 148 to the service 106 via a client application that may be the same application used for transferring the dynamic id forward. The client side application for the task may be a purpose-specific Java™ application, for example. In FIG. 2c, four graphical (image) cues are indicated at 212 in the service or device UI view 200C (browser view). Being also visible in the figure is a plurality of service features at 214, some of which are greyed out, i.e. non-active features, due to the current insufficient authentication level. Indeed, a service or particularly service application or UI feature may be potentially associated with a certain minimum security level required for access.

Automatic expiration time for the session may also be indicated via the UI. Preferably, a session about to expire or expired may be renewed by repeated/new authentication.

In FIG. 1a, at 150 the service 106 analyzes the obtained user responses (typically one response per one cue) relative to the cues against the voiceprints using predetermined matching technique(s) and/or algorithms. In primary embodiments, the input order of responses corresponding to individual cues in the overall response should match the order in which cues were represented in the service UI (e.g. in a row, from left to right). In some other embodiments, the system 106 may, however, be configured to analyze whether the order of responses matches the order of cues given, or at least to try different ordering(s). Optionally, the system 106 may be configured to rearrange the voice responses to the cues to obtain e.g. better voiceprint matching result during the analysis.

Preferably, concatenation of two or more responses to establish a single response of longer duration from the standpoint of matching is utilized. Longer duration converts into more available data, which may improve the matching and resulting classification (verification decision). Naturally, the voiceprints associated with the used cues and the claimed user identity should be concatenated as well in a manner compatible with the concatenated responses to enable appropriate comparison between the two.

Indeed, concatenation may herein refer to at least conceptually joining temporally associated (typically successive) data elements together by linking or 'chaining', or by other suitable action, to form a single entity or ensemble. One key point here is that due to the concatenation, notwithstanding its actual implementation, the (concatenated) voice responses provided to the represented cues and the (concatenated) personal voiceprints linked with the cues and the claimed identify of existing (enrolled) user can be validly compared with each other as they should temporally match each other, i.e. extend over substantially same period of time, as being clear to a skilled person in view of achieving relevant matching results.

When the response (in practice e.g. feature(s) derived therefrom) matches with the voiceprints sufficiently according to predetermined logic, the voice authentication procedure, or 'speaker verification' procedure, may be considered successful, and the authentication level may be scaled (typically raised) accordingly at 152. On the other hand, if the voice-based authentication fails (non-match), the authentication status may be left intact or actually lowered, for instance. Outcome of such authentication procedure is signaled to the user (preferably at least to the first terminal, potentially both) for p review e.g. as an authentication status message via the service UI at 154. New features may be made available to the user in the service UI.

Figure 2D:
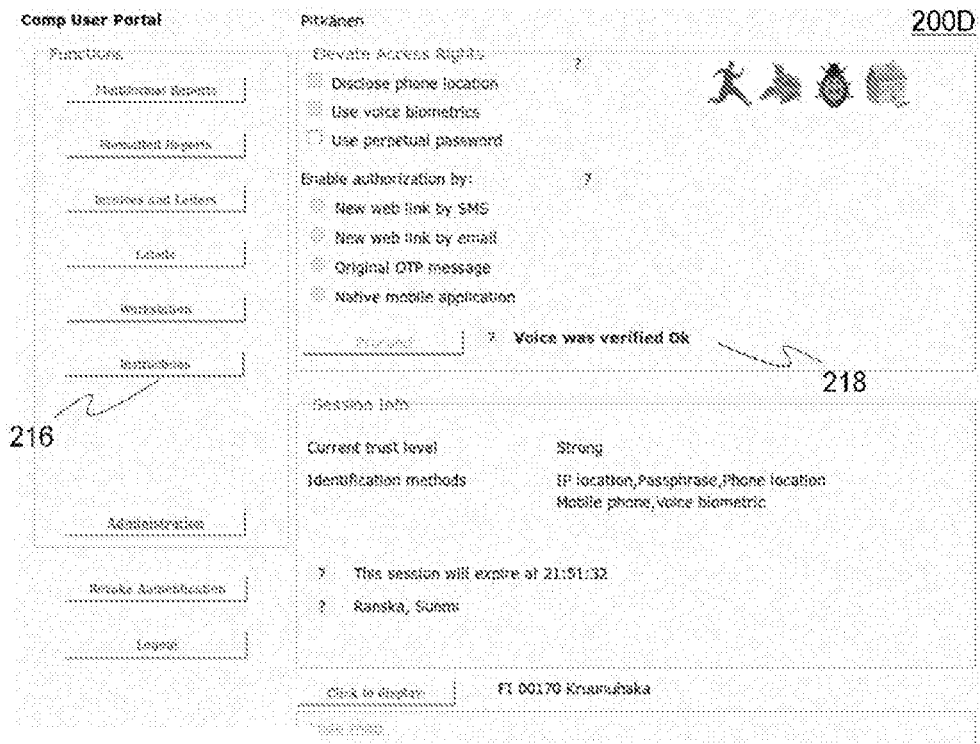
FIG. 2d represents further example of service or device UI view in connection with user authentication.

FIG. 2d depicts a possible service or device UI view 200D after successful voice authentication. Explicit indication of the outcome of the authentication procedure is provided at 218 by authentication status message and as an implicit indication thereof, more service features 216 have been made available to the user (not greyed anymore, which the user will immediately recognize)

In some embodiments, location information may be optionally utilized in the authentication process as such. In one embodiment, the server 106 and/or other entities external to the user's 102 terminal gear may be configured to locate one or more of the terminals the user 102 applies for communicating with the service 106. Alternatively or additionally, the terminal devices may bear an own role in the positioning process and execute at least part of the necessary positioning actions locally. Actions required to position a terminal may be shared between the terminal(s) and at least one external entity.

For instance, address information may be used in the positioning process to deduce the location of the particular terminal in question (see FIGS. 2b-2d wherein IP location has been identified as one applied authentication/identification criterion).

Somewhat typically, terminal or access network addresses such as IP addresses are at least loosely associated with physical locations so that the address-based locating is at least limitedly possible. In connection with mobile devices, many other options are also available including roaming signal and data transmission-based positioning. For example, by checking the ID of the base station(s) the mobile device is communicating with, at least approximate location of the mobile device may be obtained. Yet, through more comprehensive signal analysis, such as TOA (Time-Of-Arrival), OTD (Observed-Time-Difference), or AOA (Angle-Of-Arrival), the mobile device may be located.

In some embodiments, a satellite navigation receiver, such as a GPS (Global Positioning System) or GLONASS (GLObal Navigation Satellite System), in connection with a terminal device may be exploited. The terminal may share the locally received satellite information with external entities as such or in cultivated form (e.g. ready-determined coordinates based on received satellite signal(s)). Further, data entity such as data packet transit times or RTT times may be monitored, if possible, e.g. in relation to both the monitored user/terminal and e.g. location-wise known reference entities as described hereinbefore in order to assess the location of the user/terminal by associated comparison.

On the basis of the terminal location, the system 106 may then introduce a further factor, i.e. a location-based factor, to the authentication procedure and verify, whether the current location of the terminal in question matches with predetermined location information defining a number of allowed locations and/or banned locations in the light of the service and/or document access. Depending on the embodiment, the status of the location-based factor may be evaluated prior to the evaluation of the fulfillment of other authentication factors, in conjunction with them, or as a final check before authorizing the user to access the service and/or electronic document.

Figure 1B:
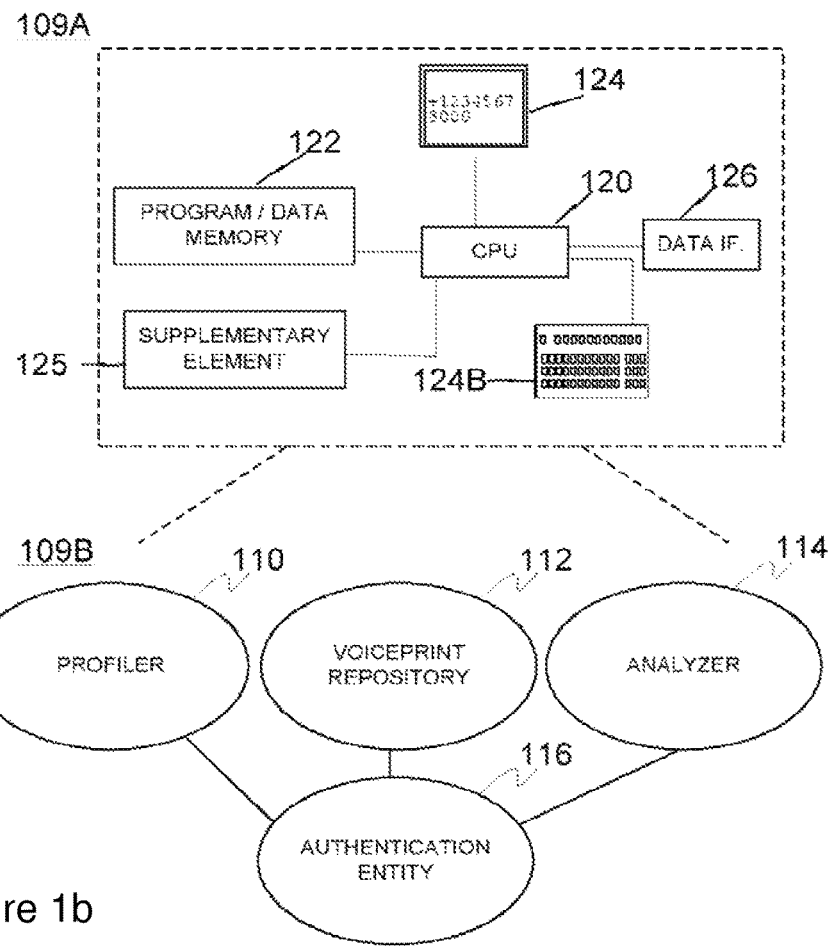
Figure 1D:
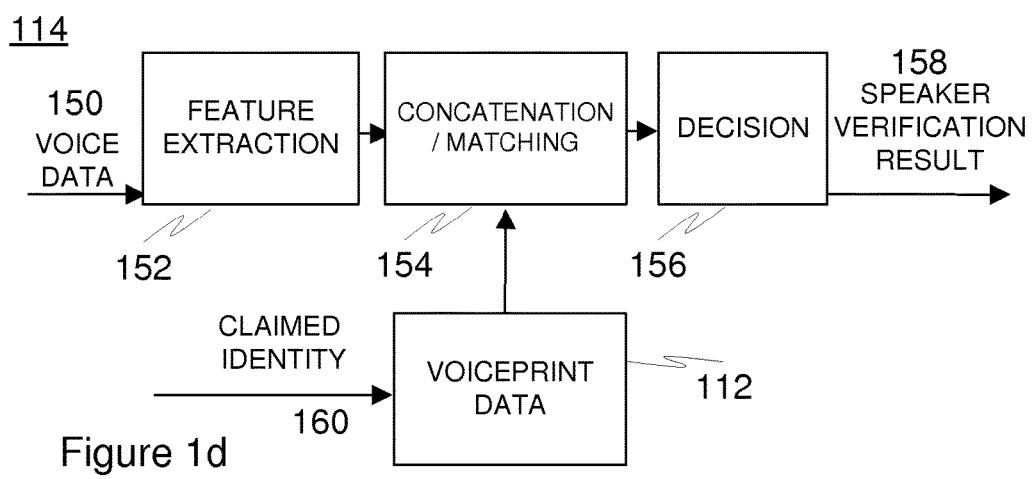
Figure 1C:
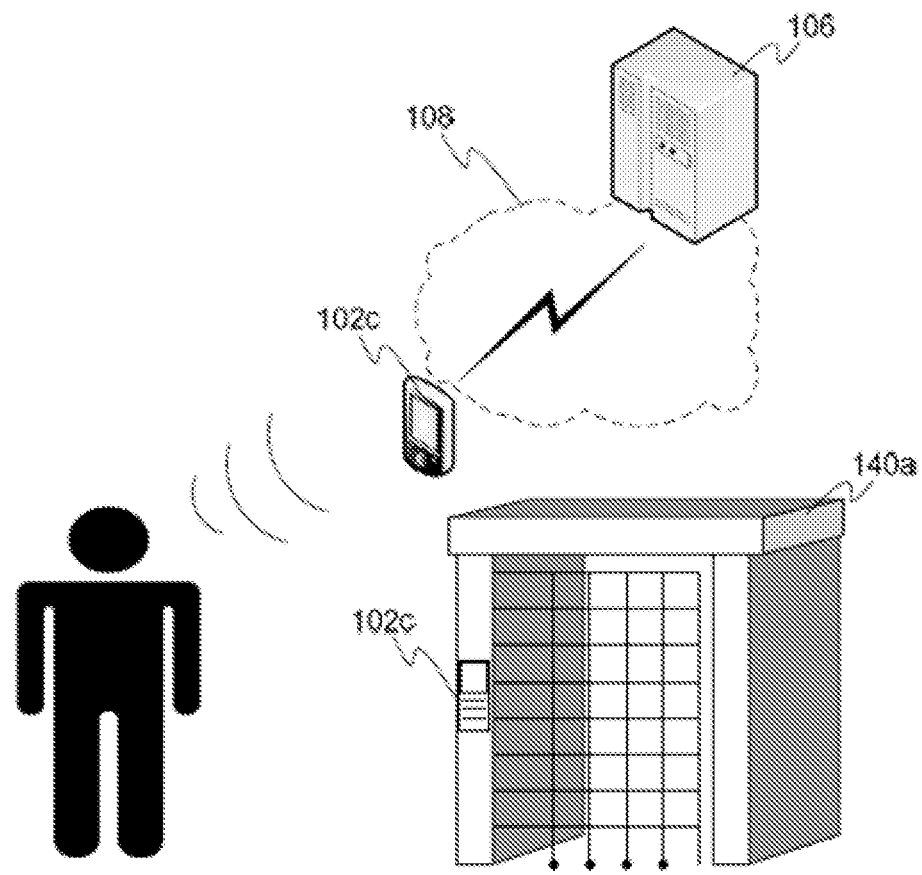

FIG. 1c illustrates few other scenarios involving the embodiments of an electronic device 102c in accordance with the present invention. The device 102c may be a self-contained in a sense it can locally take care of authentication procedure based on program logic and data stored thereat. Optionally, the data such as voiceprint data may be still updated e.g. periodically or upon fulfillment of other triggering condition from or to a remote source such as a server 106 via a communications connection possibly including one or more communication networks 108 in between. Optionally, the device 102c is registered before a remote service such as network-based service that maintains a database of devices, associated users and/or related voiceprints. Some feasible techniques for implementing user and/or device enrollment for authentication and/or other solutions has been provided e.g. in publication WO2012/045908A1 "ARRANGEMENT AND METHOD FOR ACCESSING A NETWORK SERVICE" describing different features of ZEFA™ authentication mechanism along with various supplementary security and communications related features. Depending on the embodiment, the personal voiceprints may be generated at device 102c or network side (e.g. server 106) from the voice input provided by the user in question.

In some embodiments, the device 102c may incorporate a plurality of functionally (communications-wise) connected elements that are physically separate/separable and may even have their own dedicated housings, etc. For example, an access control panel or terminal providing UI to a subject of authentication (person) may be communications-wise connected, e.g. by a wired or wireless link, to an access control computer and/or actuator, which may also take care of one or more task(s) relating to the authentication and/or related access control procedures.

The device 102c may include e.g. a computer device (e.g. laptop or desktop), or a portable user terminal device, such as a smartphone, tablet or other mobile or even wearable device.

The device 102c may generally be designated as a personal device, or used, typically alternately, by several authorized persons, such as multiple family members or team members at work, and be thus configured to store personal voiceprints of each user, not just of a single user. Storing personal voiceprints of single user only is often sufficient in the case of a truly personal device. The authentication procedure suggested herein may be utilized to control the provision of (further) access to the resources and feature(s) such as application(s) or application feature(s), for instance, in or at the device and/or at least accessible via the device by means of a communications connection to a remote party such as remote terminal or remote network-based service and related entities, typically incorporating at least one server.

The device 102c may thus be, include or implement at least part of an access control device.

In some embodiments, the access control device 102c may include or be at least connected to a particular controllable physical asset or entity 140a, 140b, such as a door, fence, gate, window, or a latch providing access to a certain associated physical location, such as space (e.g. a room, compound or building) or physical, restricted resource such as container, safe, diary or even briefcase internals potentially containing valuable and/or confidential material. Particularly, the device 102c and the suggested authentication logic provided thereat may be at least functionally connected to an (electricallycontrollable) locking or unlocking mechanism of such an asset/entity. Yet, the asset/entity may bear data transfer capability to communicate with external entities regarding e.g. the authentication task and/or outcome thereof as already contemplated hereinbefore.

FIG. 1b shows, at 109A, a block diagram illustrating the selected internals of an embodiment of device 102c or system 106 presented herein. The system 106 may incorporate a number of at least functionally connected servers, and typically indeed at least one device such as a server or a corresponding entity with necessary communications, computational and memory capacity is included in the system. A skilled person will naturally realize that e.g. terminal devices such as a mobile terminal or a desktop type computer terminal utilized in connection with the present invention could generally include same or similar elements. In some embodiments, also a number of terminals, e.g. aforesaid first and/or second terminal, may be included in the system 106 itself. Correspondingly, devices 102c applied in connection with the present invention may in some embodiments be implemented as a single-housing stand-alone devices, whereas in some other embodiments, may include or consist of two or more functionally connected elements potentially even provided with their own housings (e.g. access control terminal unit at a door connected to a near-by or more distant access control computer via a wired and/or wireless communication connection).

The utilized device(s) or generally entities in question are typically provided with one or more processing devices capable of processing instructions and other data, such as one or more microprocessors, micro-controllers, DSP's (digital signal processor), programmable logic chips, etc. The processing entity 120 may thus, as a functional entity, comprise a plurality of mutually co-operating processors and/or a number of sub-processors connected to a central processing unit, for instance. The processing entity 120 may be configured to execute the code stored in a memory 122, which may refer to instructions and data relative to the software logic and software architecture for controlling the device 102c or (device(s) of) system 106. The processing entity 120 may at least partially execute and/or manage the execution of the authentication tasks including speaker verification.

Similarly, the memory entity 122 may be divided between one or more physical memory chips or other memory elements. The memory 122 may store program code for authentication and potentially other applications/tasks, and other data such as voiceprint repository, user contact information, electronic documents, service data etc. The memory 122 may further refer to and include other storage media such as a preferably detachable memory card, a floppy disc, a CD-ROM, or a fixed storage medium such as a hard drive. The memory 122 may be non-volatile, e.g. ROM (Read Only Memory), and/or volatile, e.g. RAM (Random Access Memory), by nature. Software (product) may be provided on a carrier medium such as a memory card, a memory stick, an optical disc (e.g. CD-ROM or DVD), or some other memory carrier.

The UI (user interface) 124, 124B may comprise a display, a touchscreen, or a data projector 124, and keyboard/keypad or other applicable user (control) input entity 124B, such as a touch screen, a number of separate keys, buttons, knobs, switches, a touchpad, a joystick, or a mouse, configured to provide the user of the system with practicable data visualization/reproduction and input/device control means, respectively. The UI 124 may include one or more loudspeakers and associated circuitry such as D/A (digital-to-analogue) converter(s) for sound output, and/or sound capturing elements 124B such as a microphone with A/D converter for sound input (obviously the device capturing voice input from the user at least has one, or external loudspeaker(s), earphones, and or microphone(s) may be utilized thereat for which purpose the UI 124, 124B preferably contains suitable wired or wireless (e.g. Bluetooth) interfacing means). A printer may be included in the arrangement for providing more permanent output.

The device 102/system 106 may further comprise a data interface 126 such as a number of wired and/or wireless transmitters, receivers, and/or transceivers for communication with other devices such as terminals and/or network infrastructure(s). For example, an integrated or a removable network adapter may be provided. Non-limiting examples of the generally applicable technologies include WLAN (Wireless LAN, wireless local area network), LAN, WiFi, Ethernet, USB (Universal Serial Bus), GSM (Global System for Mobile Communications), GPRS (General Packet Radio Service), EDGE (Enhanced Data rates for Global Evolution), UMTS (Universal Mobile Telecommunications System), WCDMA (wideband code division multiple access), CDMA2000, PDC (Personal Digital Cellular), PHS (Personal Handy-phone System), and Bluetooth. Some technologies may be supported by the elements of the system as such whereas some others (e.g. cell network connectivity) are provided by external, functionally connected entities.

It is clear to a skilled person that the device 102*c* or system 106 may comprise numerous additional functional and/or structural elements for providing advantageous communication, processing or other features, whereupon this disclosure is not to be construed as limiting the presence of the additional elements in any manner. Entity 125 refers to such additional element(s) found useful depending on the embodiment.

At 109B, potential functional or logical entities implemented by the device 102*c* or system 106 (mostly by processing element(s) 120, memory element(s) 122 and communications element(s) 126) for voice authentication are indicated.

Profiler 110 may establish the cue-associated and -specific voiceprints for the users based on the voice input by the users. The input may include speech or generally voice samples originally captured by user terminal(s) and funneled to the profiler 110 for voiceprint generation including e.g. feature parameter extraction. Element 112 refers to a voiceprint repository 112 that may contain a number of databases or other data structures for maintaining the personal voiceprints determined for the cues based on voice input by the user(s).

A voiceprint associated with a cue may be established using any suitable method and stored accordingly. For example, a number of features (parameters) or feature vectors may be extracted from the captured input and used as such and/or utilized as a basis for establishing a higher level cue-specific user model.

For example, LP (linear prediction) coefficients and/or related coefficients such as MFCCs (mel-filter cepstral coefficients) or LPCCs (linear predictive cepstral coefficients) may be determined and utilized in voiceprints.

In one embodiment, a voiceprint is or includes a reference template established from the feature vectors obtained based on extracted features or feature vectors, typically short-term spectral feature vectors. Later during the testing phase, similar entities such as vectors are determined from voice responses to the cue prompts, whereupon template matching may take place. Alignment procedures such as dynamic time warping (DTW) may be applied in connection with template based matching.

Alternatively, a neural network based model may be established using extracted features such as the aforementioned LP coefficients or related cepstral coefficients as input thereto.

On the other hand, e.g. HMM (hidden Markov model) or some preferred derivative or relative thereof such as GMM (Gaussian mixture model) may be used to establish each associated voiceprint. HMMs etc. can reasonably model statistical variation in spectral features.

In addition, more general voiceprint or user model, not solely tight to any specific cue, may be established based on the voice data obtained during enrollment and optionally afterwards, if adaptation is allowed also based on testing phase utterances.

Yet, for scoring and normalization purposes a reference model may be determined using a set of imposter test utterances (i.e. utterances provided to the same cue(s) by other persons that may in practical circumstances include other enrolled users for convenience).

Based on the foregoing, voiceprint data are obviously preferably personal (user account or user id related) and characterize correct voice response to each cue (in the cue subset used for authenticating that particular user). Voiceprint data may indicate, as already alluded hereinbefore, e.g. fundamental frequency data, vocal tract resonance(s) data, duration/temporal data, loudness/intensity data, etc. Voiceprint data may indicate personal (physiological) properties of the user 102 and characteristics of received sample data (thus advantageously characterizing also the substance or message and semantic content of the input) obtained during the voiceprint generation procedure. In that sense, the voice recognition engine, or 'speaker verification engine', used in accordance with the present invention may also incorporate characteristics of speech recognition.

Analyzer 114 may take care of substantially real-time matching or generally analysis of voice input and already existing voiceprints during authentication. The analyzer 114 thus accepts or rejects the identity claim of the user. Such analysis may include a number of comparisons according to predetermined logic for figuring out whether the speaker/utterer really is the user initially indicated to the system. In some embodiments, profiler 110 and analyzer 114 may be logically implemented by a common entity due to e.g. similarities between the executed associated tasks. Authentication entity 116 may be such an entity or it 116 may at least generally control the execution of authentication procedure(s), determine cues for an authentication task, raise/lower permanent or session-specific authentication levels based on the outcome thereof, and control e.g. data transfer with terminal devices and network infrastructure(s) including various elements.

As mentioned hereinbefore, multiple cues (so-called subset) are preferably dynamically selected from the potential ones, i.e. the ones having voiceprint associated with for the claimed user, for each speaker verification round. The selection may be random or pseudo-random. The utilized logic may, for example, be configured to keep track of the utilization frequency of different cues so that different cues are more or less alternately and evenly selected. In this sense, the embodiments of the present invention have some common features with so-called 'random digit strings' or 'randomized phrase prompting' type speaker verification, however the present solution being based on user-selected cues and related natural and fully personal memory associations instead of e.g. digits or predefined phrases.

Also an indication of duration of each voice response used to establish a corresponding voiceprint may be stored together with the voiceprint and cue data so that the selection may be based on the duration data. For example, it may be ascertained that the selected cues correspond to voiceprints associated with a total, combined duration exceeding a predefined minimum threshold enabling reliable verification. A larger number of shorter duration-associated cues or a smaller number of longer duration-associated cues may be selected as a result so that the minimum duration criterion is reached. The minimum overall duration may be e.g. a few seconds such as five seconds depending on the embodiment.

The suggested strategy for dynamically picking up cues having voiceprints associated therewith for the identity verification of the claimant can thus be considered as innovative evolution of phrase prompting type and text dependent speaker verification solutions, whereupon existing tools such as feature extraction, modeling, matching and scoring methods used in such are also generally applicable in connection with the embodiments of the present solution.

FIG. 1d illustrates one embodiment of analyzer 114 configured to perform speaker verification tasks in connection with the authentication procedure of the present invention.

At 150, sound data indicative of captured sound input is received whereas numeral 160 refers to obtaining an indication of a claimed user identity so that a corresponding personal voiceprint data such as user model(s) may be retrieved from the repository for the selected cues.

Item 154 refers to matching/comparison actions including e.g. template matching, nearest-neighbor matching and/or other non-parametric matching or alternatively parametric model matching such as HMM matching. Preferably, sound data representing several, preferably all, voice responses uttered (one response per cue) are concatenated to establish a sound data entity corresponding to longer duration of voice or generally sound input. Also related voiceprint data (voiceprints associated with the particular cues in question for which voice responses have been given by the claimant and potentially general user model data mentioned hereinbefore) is concatenated in a compatible manner so that their mutual comparison becomes possible. For example, cue-specific HMMs or other models based on voice input gathered from the claimed user during the enrollment phase may be combined or chained for the comparison.

The used scoring method providing e.g. probability of a match between the claimed identity and the voice input from the claimant may involve different normalization methods to cope with dynamic conditions such as environmental conditions like background noise etc. For example, parameter-domain equalization such as blind equalization may be considered. Alternatively, likelihood ratio (detection) based scoring may be applied utilizing besides a determined probability of the responses truly representing the claimed identity also the probability of the responses representing other persons. Generally, H-norm, Z-norm or T-norm score normalization may be additionally or alternatively utilized.

In some embodiments, several models and relating classifiers may be utilized in parallel so that score fusion involving combining the classifiers providing uncorrelated results becomes possible.

At 156, a decision is made about the outcome of the verification procedure based on predefined fixed or adaptive threshold(s) set for the established score(s). The result 158 (often binary: identity claim accept/reject) is signaled forward.

In some embodiments, a throat microphone preferably in contact with the skin surrounding the larynx may be used to capture the voice responses in addition or instead of mouth or 'close-speaking' type air microphone. The resulting signal (hereafter called throat speech) is very similar to normal speech. Due to its proximity to the speech production system, speech recorded from a throat microphone is clean, and is not affected by environmental noise in contrast to the mouth microphone.

In some embodiments, voiceprints may be adapted based on the voice responses obtained during verification actions (testing phase). When the claimant has been deemed as the claimed identity, the associated voiceprints used during the verification round in question, and optionally also voiceprints and/or more general user model(s) unused during the verification round, could be updated to increasingly resemble the latest response, for instance.

Regarding certain embodiments with additional location-based authentication, e.g. the system 106 may provide a dedicated location(ing) id, a 'geokey', to the user 102 preferably through browser data such as service view, e.g. a login/authentication view or a portal view. The user 102 may then notice the (visualized) ID among the service data as a numeric code or generally a string of optionally predetermined length. The ID may be dynamic such as session-specific and/or for one-time use only. In some embodiments, the location id may be combined with the session id (or a common id be used) or generally with data provided by the system for voice authentication e.g. via machine readable optical code like the QR or other optical, optionally matrix type, code.

The user 102 may input or read the code to the (second) terminal, after which the application installed thereat, acquires location data according to predetermined logic based on available positioning options. Preferably, the location data is acquired in real-time or near real-time fashion upon receipt of the id to be current. For example, the device may contain a satellite receiver such as GPS or GLONASS receiver through which location data may be obtained. In addition, the device may utilize network and related signal(s) for obtaining location data such as data provided by cellular network and/or short-range wireless network, optionally WLAN. Network-assisted positioning may be used. The application may be configured to utilize available interfaces provided with the mobile operating system for acquiring the positioning data.

Location data such as longitude information, latitude information, accuracy or error estimate, the id itself or data derived therefrom, and/or time code (or time stamp) may be then collected and transmitted to the system 106. Preferably at least part of the data is encrypted. Optionally, at least part of the above data elements may be utilized for determining a hash by means of a secret or asymmetric key, for example, in which case at least the hash is transmitted. HTTPS may be utilized for the secured transfer. The system 106 receives and optionally processes such as decodes the data. Subsequently, the system 106 may verify the current location of the user 102, as indicated by the obtained location data, against predetermined data indicative of e.g. allowed location(s). The resolution of the obtained data and/or related measurement error estimate may be utilized to adapt the decision-making. For example, in the case of a larger error/worse positioning accuracy, more tolerance may be allowed in verification process, and vice versa.

In one embodiment, the system 106 is configured to maintain data about allowed (and/or rejected) user locations through utilization of polygon data, i.e. geo-referenced polygon data. For example, a number of allowed postal areas represented by the corresponding polygons may have been associated with each user. The obtained location data may be mapped to a corresponding postal area polygon that is then searched from the list of allowed postal area polygons. In such an embodiment, the aforesaid adaptation may be realized by stretching or shrinking the postal area polygon boundaries, for instance.

In the case of a positive outcome (allowed location detected), the system 106 may again update the authentication, or generally 'security', status of the user 102 accordingly and typically raise it. In practice, the user 102 may be provided with enhanced access rights to service features such as payment/finance components, higher security documents, etc. as reviewed above. Each user may be associated with session-based information such as session record dynamically keeping track of, among potential other issues, the user rights emerging from the successful authentication actions. A notification of the raised access security level or failed authentication may be transmitted to the user via mobile application and/or through browser data. The system 106 may update the service parameters for the session automatically and provide an updated service view such as browser view to the user's terminal.

Figure 3:
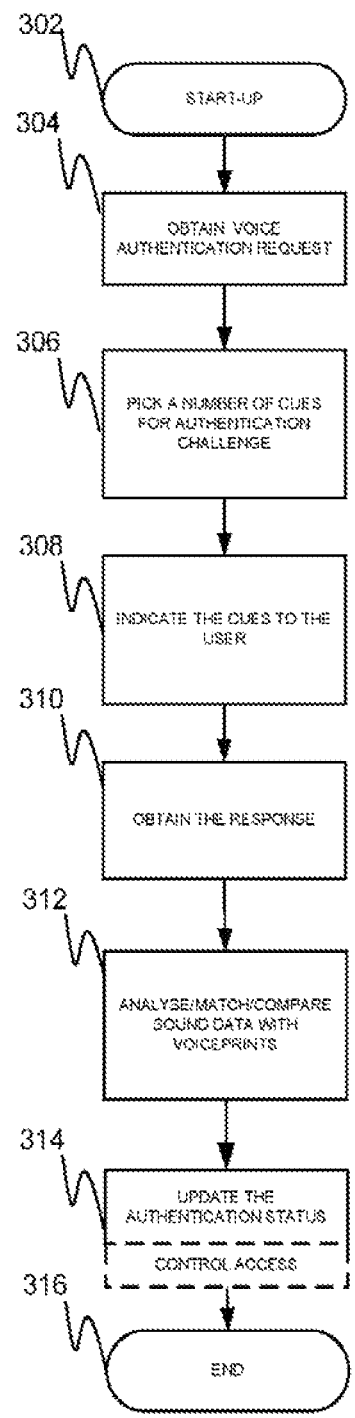
FIG. 3 is a flow chart disclosing an embodiment of a method in accordance with the present invention.

FIG. 3 discloses, by way of example only, a method flow diagram in accordance with an embodiment of the present invention.

At 302 the device and/or system of the present invention is obtained and configured, for example through loading and execution of related software, for managing the electronic service and related authentication mechanism(s).

Further, for users willing or obliged to use voice authentication, the voiceprints shall be established as described in this text earlier using a preferred training/enrollment procedure. For example, the device/system may be trained by the user such that the user utters the desired response (association) to each cue in his/her preferred and/or at least partially machine-selected (sub-)set of cues, whereupon the system extracts or derives the voiceprints based on the voice input. Further, the user may be asked to provide some general or specific voice input that is not directly associated with any voiceprint. Using that voice input, the system may generally model the user-specific voice and/or speech features to be later applied in voice-based authentication and voiceprint matching, for example.

At 304, an indication of a required authentication, such as voice authentication request, is received from a user via feasible UI such as access control terminal, digital service UI (e.g. browser-based UI) or e.g. via a dedicated application. The request may be associated with a certain user whose voiceprints are available. The request may identify such a user identity by a user ID, for example. Procedures potentially incorporating linking first and second terminals of the user relative to the current service session have been already discussed in this text. Naturally, e.g. in the case of a single user personal, self-contained device comprising personal voiceprints only for the particular user, such user identity indication is not necessary.

At 306, a number of cues (for which voiceprint is available by the indicated user) are determined or selected preferably from a larger group thereof. The selection may be random, alternating (subsequent selections preferably contain different cue(s)), and/or following some other logic. The number of cues per authentication operation may be dynamically selected by the system/device as well. For example, if a previous voice authentication procedure regarding the same user identity failed, the next one could contain more (or less) cues, and potentially vice versa. Also the status of other authentication factor(s) may be configured to affect the number. For example, if the user has already been authenticated using some other authentication factor or element, e.g. location, the number of cues could be scaled lower than in situation wherein overall authentication status of the user is weaker.

At 308, the cues are represented to the user via a user device utilized for service access, stand-alone user device, or e.g. an access control (terminal) device. For example, at least indication of the cues may be transmitted by a remote system to the (first) user terminal potentially with instructions regarding visual and/or audible reproduction thereof e.g. via a browser. Preferably, the cues are represented in easily noticeable and recognizable order so that the responses thereto may be provided as naturally as s possible following the same order. For example, graphical cues may be represented in series extending from left to right via the service or application UI, and the user may provide the voice responses acknowledging each cue in the same, natural order advantageously without a need to provide any separate, explicit control command for identifying the target cue during the voice input stage.

The user may utter the response to each cue one after each other by just keeping a brief pause in between so that cue-specific responses may be distinguished from each other (and associated with proper cue) in the overall response afterwards by the terminal or the system based on the pauses having e.g. reduced or at least different signal energy or power in contrast to speech-containing portions. The uttered response per cue may be just a single word or alternatively, a complete sentence or at least several successively pronounced words or generally voices (e.g. exclamations). Alternatively, the user may explicitly indicate via the UI, through cue-specific icon/symbol selection, for instance, to which cue he/she is next providing the voice response.

Indeed at 310, the voice response to the challenge formed by the cues, such as graphical images, videos, and/or audio files, is provided by the user and potentially forwarded via the terminal to a remote analyzing entity such as the authentication system. The sound signal data forwarded may include digital sound samples, such as so-called raw or PCM (pulse-code modulation) samples, or e.g. a more heavily parameterized compressed representation of the captured voice.

At 312, the obtained voice response data is analyzed against the corresponding personal (user-specific) voiceprints of the represented cues. The analysis tasks may include different matching and comparison actions following a predetermined logic as explained hereinbefore. For example, a preferred classification algorithm may be exploited potentially followed by additional quality checking rules determining whether even the obtained matching score (e.g. probability figure) was sufficient to acknowledge the current user as the claimed one. The logic may apply fixed threshold(s) for making decisions (successful authentication, failed authentication), or alternatively dynamic criteria and/or so-called normalization procedures may be applied. For instance, if e.g. heavy background noise is detected in the obtained sound data, criteria could be loosened.

Preferably, the analysis and matching phase incorporates concatenation of several responses to several cues together to establish a response of longer duration. Accordingly, the corresponding voiceprints (associated with the claimed user identity and with the same cues as for which responses have been now gathered) shall be combined for the matching/comparison phase. A voiceprint is typically associated with a single cue only, but there may also be voiceprint(s) or user model(s) to be used in matching that correspond to several cues or the associated user in general (they may generally characterize the user such as vocal tract properties, fundamental frequency, etc.). Such general voiceprints may be established based on e.g. all enrollment data provided by the user as original response/training data having regard to the cues he/she has selected, for example, and/or based on additional voice input potentially not relating to the cues.

At 314, based on the outcome of the speaker verification process, the authentication status or level associated with the user is updated accordingly (raised, lowered, or left as is). The user may be provided with access to new location(s) or source(s) (typically takes place only if the authentication status is raised).

At 316, the method execution is ended.

A computer program, comprising a code means adapted, when run on a computer, to execute an embodiment of the desired method steps in accordance with the present invention, may be provided. A carrier medium such as an optical disc, floppy disc, or a memory card, or other non-transitory carrier medium comprising the computer program may further be provided. The program may be delivered over a communication network or generally over a communication channel.

Figure 4:
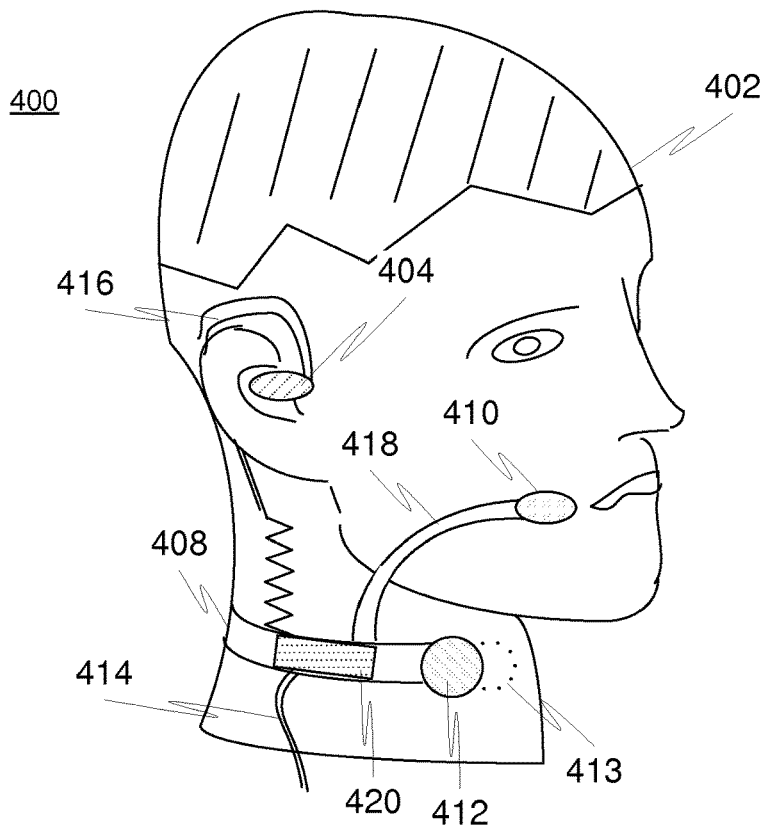
FIG. 4 illustrates an embodiment of a dual microphone apparatus and headset applicable in connection with the present invention.
Figure 5:
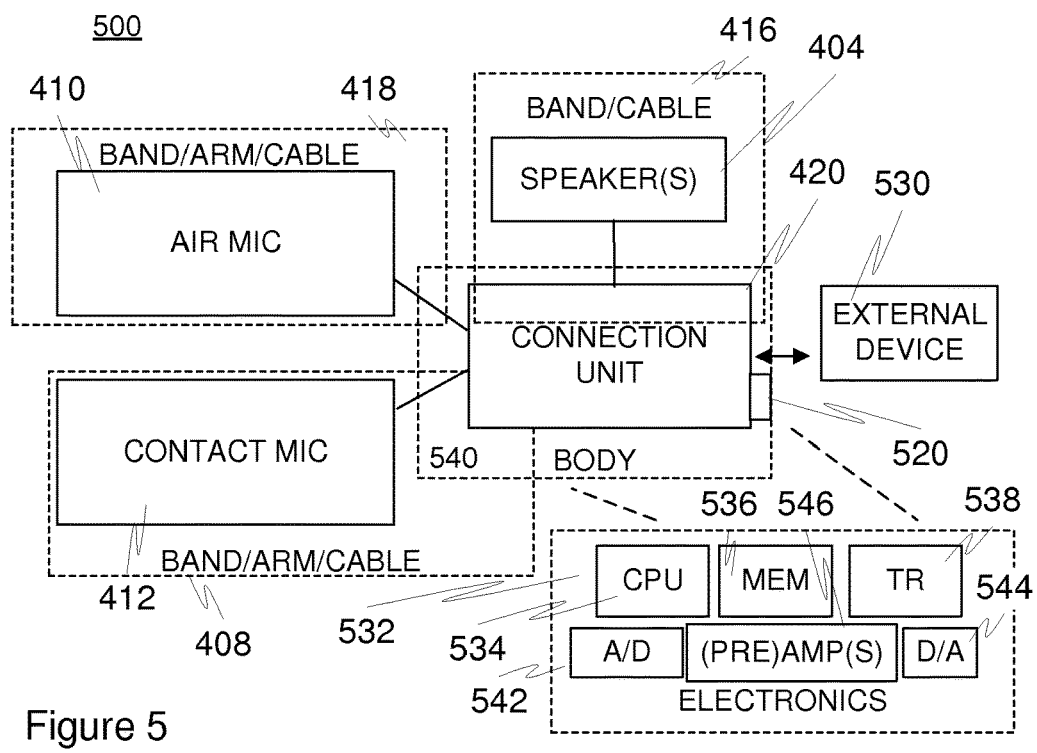
FIG. 5 is a block diagram representing an embodiment of the dual microphone/headset apparatus.

FIG. 4 illustrates, at 400, an embodiment of an essentially a dual microphone apparatus preferably integrated in a headset apparatus applicable in connection with the present invention. Duality in this case refers to the integration of both air microphone 410 and contact microphone 412, preferably a throat microphone, in the same accessory. FIG. 5 is, in turn, a block diagram 500 representing selected internals of a dual-microphone of e.g. FIG. 4. The microphones 410, 412 may be active simultaneously or one at a time, which is preferably user-selectable.

The contact microphone 412 may be positioned against the skin of the neck of user 402 thus substantially corresponding to the location of the throat and larynx, for example, to capture the vibration emanating from a vocal tract due to ongoing voice production process. For the purpose, the contact microphone 412 may comprise one or more sensors.

Instead, the air microphone 410 preferably comprises a mouth microphone (close-speaking microphone) that may be positioned by arm 418, for example, next or in front of the mouth of the user 402. Accordingly, sound pressure waves emanating via the mouth may be effectively captured.

The actual technology underlying the sensors used for capturing the vibration/pressure waves may be selected by a skilled person to best fit each particular use scenario and application of the present invention having regard to e.g. size, shape, sensitivity, frequency response, and directivity/directional pattern.

Preferably the first 410 and second 412 microphone comprise or are connected to suitable fastening or positioning means to enable locating and aligning the microphone as desired. These means may include e.g. band or earpiece 416, arm 418, band or strap 408, adhesive surfaces and/or different clips for enabling attachment to clothing or skin. These may be user-adjustable as to their effective size or shape.

Preferably the apparatus 400, 500 comprises at least one ear speaker 104 for converting the signal received from e.g. external device to audible pressure waves (sound). Optionally or alternatively, a number of internally generated signals such as status signals may be converted to audible form. In some embodiments, dual or stereo headphones may be considered where there's a dedicated speaker for each ear. The speaker 104 may be of ear pad or in-ear type, for instance.

In addition to ear speaker 104, or instead thereof, a speaker configured to emit sound generally to the environment may be included.

For the speaker(s), the apparatus 400, 500 preferably contains an amplifier 246 to amplify D/A (digital-to-analogue) converted 544 signal to a desired level, which may be controllable by a UI (user interface) element such as a button, control wheel, or other UI element accessible by the user 402.

Indeed, depending on the embodiment, the apparatus 400, 500 may contain UI such as at least one button, control wheel, touchscreen, touchpad, slide switch, (turn) switch, indicator light (e.g. LED), voice (command) control, vibration element (e.g. electrical motor) etc. in connection with e.g. a connection unit 420 or a suitable wire/cable.

The electronics 532, which are preferably at least partly included in the connection unit 420, may further incorporate a power source such as at least one (disposable) battery, rechargeable battery or at least connector for external power source. In wired embodiments, power/current may be at least partially provided via conductors (wire/cable) from an external device or other source. Wireless power supply or charging is possible as well, whereupon the apparatus may include a wireless power receiving element such as a coil for inductive coupling.

Accordingly, a headset comprising the dual microphone apparatus and at least one speaker may be provided. In some embodiments, the dual microphone or headset may be integrated with headwear such as a helmet or other garment, preferably removably.

Contact microphone 112 may in some embodiments include several, at least, two sensor elements (412, 413), e.g. on both sides or otherwise symmetrically or asymmetrically positioned having regard to the throat or larynx of the user 402.

One or more elements of the dual-microphone or headset apparatus 400, 500 may establish at least part of a body 540, or of a body part in cases where the apparatus 400, 500 can be considered to contain multiple body portions connected together e.g. via wires or cables. Preferably the apparatus 400, 500 contains one or more body parts incorporating or connecting to at least one of the aforesaid air and contact microphones and/or the speaker(s) e.g. via a preferably user-adjustable joint or sliding mechanism.

The body (parts) may have been configured to host, protect and/or support other elements such as the aforesaid microphone, speaker or additional elements. The body may further have acoustic function (e.g. sound box) in view of the microphone or speaker. The body may contain a substantially solid or rigid, but optionally still reasonably flexible or elastic from the standpoint of e.g. wearing or bedding, piece such as a housing, arm or band, e.g. element 416 for placement against the head or neck (e.g. throat) of the user 402. Additionally or alternatively, the body may contain a strap or band, such as item 408, for neck or chin placement with a desired level of flexibility and/or elasticity.

Yet, the apparatus 400, 500 may include various conductors (signal, earth, current, phase, etc.), corresponding wires or cables that connect the various elements of the apparatus functionally, e.g. electrically, together, regarding e.g. connection unit, microphone(s) and speaker(s). In some embodiments, mere cable may be used to connect element such as in-ear speaker 404, air microphone 410, or contact microphone to another element such as connection unit 420 without more rigid body part(s).

Preferably A/D transducer 542 is included to convert microphone signals into digital form. Pre-amplifier (as part of amplifier block 546) may be provided to amplify the electrical microphone signals.

Yet, the apparatus 400, 500 may include a sound codec to encode the microphone signals or common signal derived based thereon in accordance with a desired standard or encoding scheme e.g. for compression purposes.

A sound decoder may be included for decoding received signals for audible reproduction via speakers. The codec(s) may be implemented through a number of ASIC circuits (application-specific integrated circuit) or more general processing device 534. These elements and e.g. the aforesaid D/A transducer 244 and/or speaker amplifier may be included in the connection unit 520 or implemented separate therefrom.

The apparatus 400, 500 may include, e.g. in connection unit 520, a wireless transmitter, receiver or transceiver 538 for the transfer of electrical, or digital, sound signals (which may in practice be coded data signals) relative to external device(s) 530 such as mobile terminal, or other potentially personal terminal device such as a tablet, phablet, computer, laptop, or an entertainment electronics device, e.g. a game console, a portable music or multimedia player, a (smart) television, wearable electronics (e.g. wristop computer, smart clothing or smart goggles), a tuner-amplifier/stereo, or a corresponding device.

The used wireless technology may follow a selected standard of e.g. radio frequency band. Bluetooth™ or its variant is applicable, so is WLAN (wireless LAN), or a cellular solution. The transmission path between the described apparatus and external device 530 may be direct or contain a number of intermediate elements such as network infrastructure elements. Instead of or in addition to radio frequencies, e.g. infrared frequencies or optical data transmission is possible. For wireless communication, the apparatus 400, 500 may further include one or more antennae, optionally in-molded within the body part(s) or other elements of the apparatus.

In some embodiments, the apparatus 400, 500 contains at least a wire, cable 414 and/or connector 520, to wiredly connect to the external device 530 such as mobile terminal (e.g. smartphone or tablet) for electrical or particularly digital audio signal transfer and e.g. control data signal transfer. This wired interface may follow a selected standard such as USB (universal serial bus) standard. The connector 520 may receive a cable or directly the compatible counterpart (matching connector, e.g. male vs. female connectors in the general shape of protrusion or recess) of the external device 530.

In some embodiments, at least part of the connection unit 420 and related electronics 532 may be provided in a dedicated separate housing that is connected e.g. to the microphones 410, 412 wirelessly and/or wiredly, using e.g. cables or low-power wireless communication such as Bluetooth low energy™. The connection to the external device 530 such as a mobile terminal may be then wireless or wired as described above, using e.g. a cable or connector 520.

In some embodiments, the apparatus 400, 500 is configured to determine a common signal based on the first and second microphone signals e.g. in the connection unit 420. Alternatively, such processing could take place at the device 530. The common signal may be electrical/digital signal established from the first and second signals preferably through means of signal processing. For the purpose, the apparatus 400, 500 may apply the processing device 534 comprising e.g. a microprocessor, signal processor, microcontroller, related memory 536 e.g. for storing control software and/or sound signal data, and/or other circuit. The device 534 may execute different coding, decoding and/or other processing tasks such as filtering, voice (activity) detection or noise or echo detection/cancelling.

In embodiments where the first and second microphone signals locally captured are used to determine the components of a multi-channel signal, e.g. stereo signal, each microphone signal or signal derived therefrom may have been optionally allocated with a dedicated channel (e.g. left or right). These channels may be jointly or independently coded, using e.g. different codecs per channel.

The audio codecs applied in connection with the present invention may include any suitable codec, e.g. selected codec under Bluetooth A2DP (audio distribution profile) definition. The supported codec(s) may include at least one element selected from the group consisting of: aptX or derivative thereof, SBC (subband codec), mp3 (MPEG-1 audio layer 3), AAC (advanced audio coding), ATRAC (adaptive transform acoustic coding), and CELP (code-excited linear prediction) or derivative thereof (e.g. ACELP, algebraic CELP).

In some embodiments, the apparatus 400, 500 may be configured to establish further information or metadata such as control or synchronization information for transmission to the external device 530 for (mutual) synchronization of the microphone signals and/or indicating parameters used in capturing or coding them (e.g. microphone properties, background noise properties as captured using at least one microphone, such as level or stationarity), for optimized further processing of the signals/common signal or for other purposes.

Figure 6:
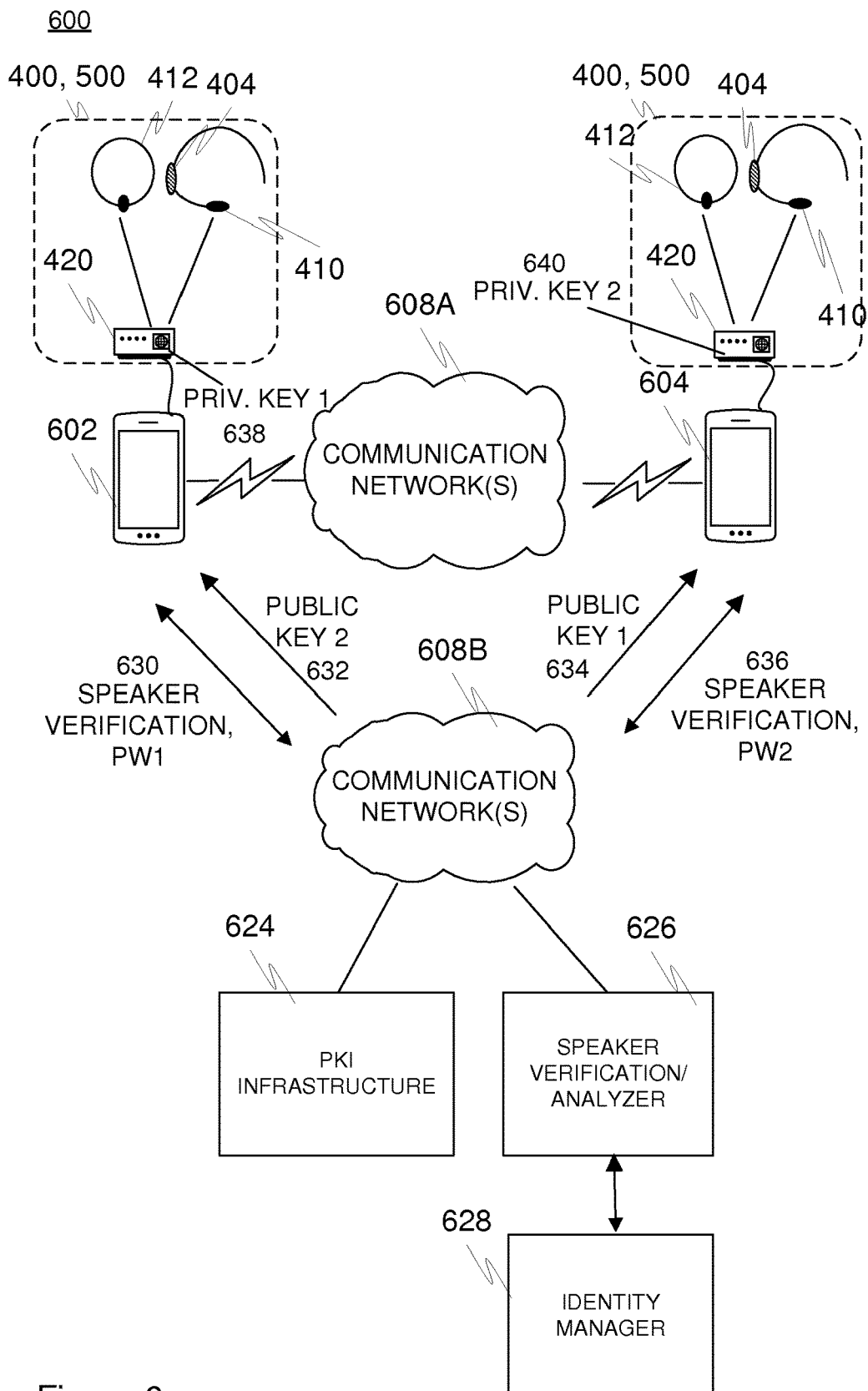
FIG. 6 illustrates one further embodiment of a dual microphone/headset apparatus via a potential use scenario thereof.

FIG. 6 illustrates, at 600, one further embodiment of a dual microphone apparatus via a potential use scenario thereof. In this use scenario, voice communication such as a voice call may be encrypted, for example.

The apparatus 400, 500 contains a connection unit, or 'interface', 420, which may be implemented as an electronic device, which may have a housing of its own. The unit 420 is connected, using e.g. a compatible connector or a cable to a mobile terminal or generally terminal 602, 604 as discussed hereinbefore. In some variations of the shown embodiment, the apparatus 400, 500 could contain only a throat or air microphone, but still the same encryption procedure presented herein could be generally implemented as being understood by a person skilled in the art.

Nevertheless, in the case of voice communication between two parties, the associated terminals 602, 604 may be both provided with an embodiment of the apparatus 400, 500.

The connection unit 420 of terminal 602 is configured to apply a public key 632 associated with a second party, such as a user of a remote terminal device 604, for encrypting the first and/or second microphone signals, or e.g. a common signal based thereon, to be transmitted to the remote terminal 604 and ultimately preferably the related connection unit 420 for decryption and potential audible reproduction via speaker(s). Alternatively, the public key 632 may be utilized to cipher the transfer of e.g. session-specific encryption key for the signal(s).

The connection unit 420 of terminal 604 is also configured to store a private key 640 to decrypt incoming audio signal(s) encrypted using the second key 632 for audible reproduction.

The connection unit 420 of the remote terminal 604 may respectively apply the first public key 634 associated with the user of terminal 602 for encrypting the signal(s), or e.g. session-specific encryption key for the signal(s), transmitted to the terminal 602 and associated connection unit 420 for decryption using private key 638 and potential audible reproduction. For encrypting and decrypting purposes the units 420 apply the included electronics such as general purpose processing devices or dedicated encryption/decryption circuits.

The encrypted connection, e.g. a circuit or packet switched call, between the terminals 602, 604 may be conveyed through communications network(s) 608A such as cellular network(s) and/or data networks, e.g. the Internet. The network(s) 608B supplying e.g. private or public keys and dealing with authentication and speaker verification may have one or more common member(s) or legs with the network(s) 608A utilized for encrypted (voice) data transfer. Preferably at least the network(s) 608B and optionally also 608A include the Internet in favor of broad coverage and userspace.

Public 632, 634 and private keys 638, 640 may be served to the terminals 602, 604 e.g. by appropriate elements of the applied public-key cryptography infrastructure, e.g. PKI (public key) infrastructure, creating and/or maintaining such keys as being understood by a skilled person. Additionally, public keys 632, 634 may be provided also in a variety of other ways, e.g. via web pages.

Preferably the private keys 638, 640 stored at units 420 are encrypted and protected e.g. by passwords or passcodes. The passwords or passcodes may be maintained and served by remote system incorporating e.g. speaker verification/analyzer modules 626 as described e.g. hereinbefore and identity management 628 storing e.g. user information and taking care of authentication. The remote entities 626, 628, if implemented as separate entities or systems, are preferably mutually assured by using a selected SSO (single sign-on) authentication federation protocol, e.g. OpenID Connect, which preferably supports also machine-to-machine federation.

In more detail, responsive to successful authentication preferably utilizing the afore-explained audiovisual associative authentication based on the application of air and/or contact microphone signals, or signal(s) derived therefrom, cultivated with the suggested aspects of speaker verification, the passwords or passcodes (PW1, PW2) for using private keys 638, 640 may be delivered 630, 636 to the concerned terminals 602, 640 and preferably further to the connected units 420 for use in decrypting. Preferably the passwords or passcodes are not permanently stored but have to be re-acquired as defined in the active authentication settings, e.g. per session or daily.

Encryption feature may be optionally controlled via unit 420 or terminal (application) 602, 604 preferably connection-specifically.

In some embodiments, the terminals 602, 604 may be configured to apply the private keys 638, 640 for deciphering data or signing data such as messages or documents.

Figure 7:
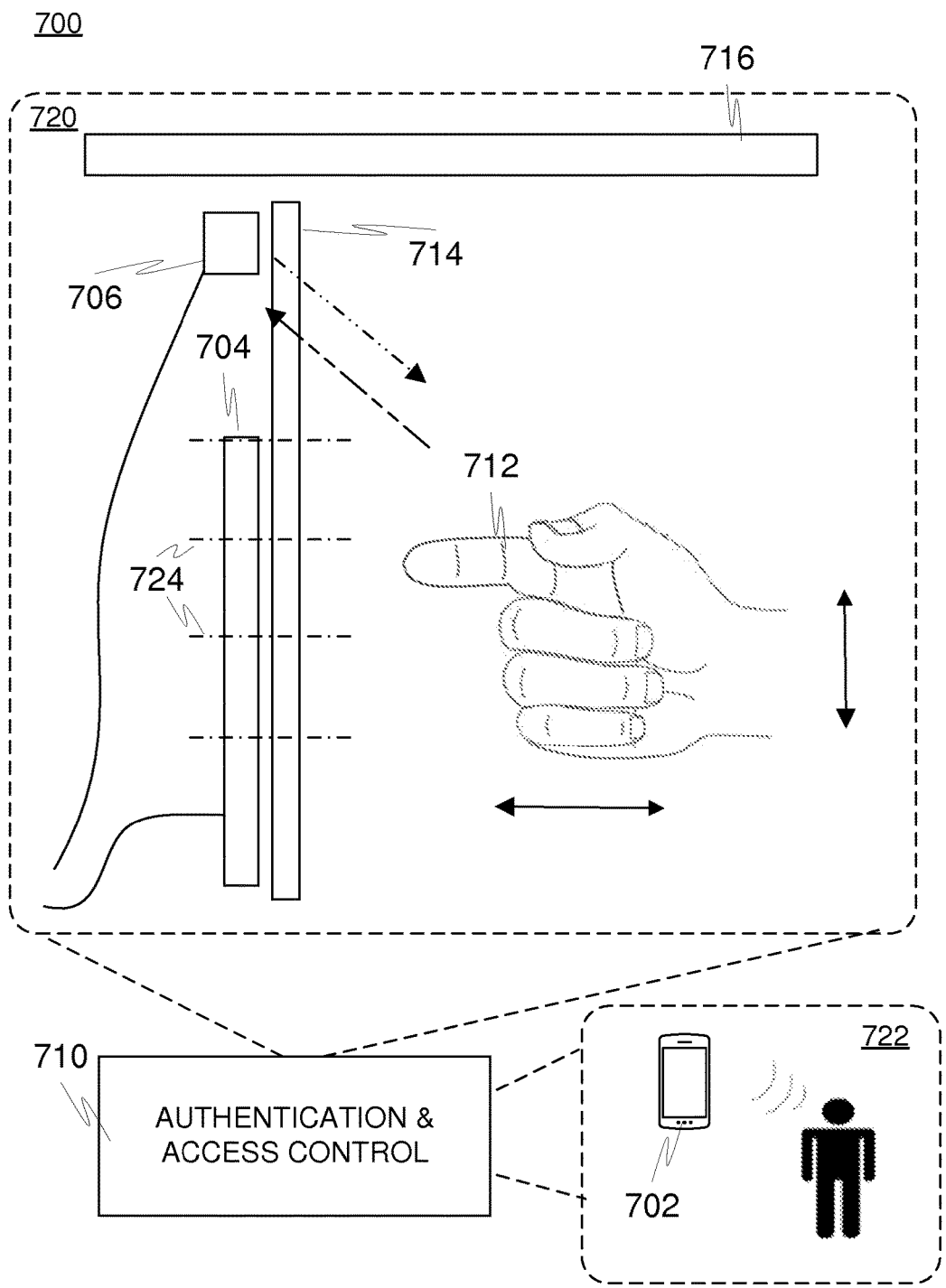
FIG. 7 depicts one further use scenario wherein various principles set forth herein may be applied for user authentication and access control.

FIG. 7 depicts, at 700, one further use scenario wherein various principles set forth herein may be applied for user authentication and access control.

In this scenario, user authentication and related access control through e.g. a door or gate preferably have a dual nature with reference to aspects 720 and 722.

At 720, a display element, such as display of a computer, one-in-all or tablet type integrated computer device, or e.g. canvas of a projector arrangement, 704 is provided behind a protective substantially optically transparent sheet, such as glass or plastic sheet, 714 such that the display element 704 is visible through the sheet 714. The display 704 may be in contact with the protective sheet 714 or there may be space in between. Preferably the sheet 714 comprises anti-scratch surface (coating) or armor-glass so that it may be contacted without major risk of damaging it and it withstands different environmental conditions such as weather conditions when installed so as to face e.g. outdoor area. Preferably, the sheet 714 is still of replaceable or reparable (e.g. polishable) nature and therefore in many embodiments advantageously not fixedly laminated, for example, with the display 704.

Item 706 refers to at least one position and/or motion sensor such as infrared or other optical sensor, electromagnetic sensor or e.g. (thermal) imaging sensor, which is optionally integrated with the display 704. It 706 is calibrated and aligned so as to functionally, in terms of object detection and tracking capability, cover a selected three-dimensional space in front of the display 704 and overlay sheet 714 so that user input element such as human hand, finger or other stylus or generally object 712 may be detected and tracked therein. The sensor 706 may include a plurality of sensors to increase the three-dimensional detection accuracy and e.g. detection space or range. The sensor 706 may be active, i.e. it may contain e.g. an infrared source of its own.

Accordingly, the control entity 710, which may incorporate an embodiment of the authentication system described hereinbefore or at least selected elements such as speaker verification related elements thereof, is at least functionally connected to the display 704 and sensor 706 for managing user authentication and interaction therewith, and optionally related access control.

The display 706 may be arranged to exhibit stimulus such as a request or 'prompt' for inputting a password or passcode to gain access in the monitored area or space, or generally (physical) resource, controlled by the shown arrangement. A plurality of selectable items, typically symbols, e.g. letters and/or digits, may be shown on the display e.g. in a matrix form (including e.g. 3×3 matrix with digits from 1 to 9, or characters from 0 to F in 4×4 matrix form), which is indicated in the figure by dotted lines 724 depicting a potential height of and separation between adjacent symbols visualized. Preferably the size is selected large enough to enable easy selection (pointing) of each symbol by the user.

A finger 712 of the user or other stylus, and especially e.g. the position thereof, may indeed be tracked by sensor 706 while the user points at the symbols in a sequence making up his/her password or passcode. The user may bring his finger/stylus in contact with sheet 714 or let it remain distant therefrom, hovering in front thereof. Depending on the embodiment, the trajectory of the finger 712 may be tracked instead of or in addition to the (at least momentarily static) end position to determine the pointed symbol or potential other predetermined input command provided via a finger or hand gesture, for example. E.g. certain type of motion such as a swiping or twirling motion could be deemed as a selected input command such as resetting the input, acknowledging the inputted password or code or cancelling the previously inputted symbol.

In response to detecting a finger trajectory ending up at pointing a certain rendered item, or just detecting the end position of the finger pointing at the same, input of that item may be registered. Substantially upon the same instant, the user may be given related feedback such as visual feedback (e.g. shadowing or encircling the item, for example) and/or audible feedback via a speaker (not shown) to acknowledge to the user that the current input was duly detected.

In addition to the above authentication and access control task taking place at the location of the controlled access point, speaker verification based on the audiovisual associative authentication may be executed, with reference to item 722. The user may be shown the cues via the display of his/her mobile terminal 702 whereto he/she responds by saying aloud the corresponding words or sentences he/she used when originally creating the reference voiceprints upon voice authentication set-up phase. Successful speaker verification may elevate the user rights gained together with the successful input of proper password or passcode via the display system 720.

Responsive to authentication considered successful, the equipment 710 may control e.g. an electrical lock, optionally via a relay, to provide the desired access to the user.

In some embodiments, the cues could be shown on the display 704 instead of or in addition to the personal terminal 702.

In the shown embodiment, a local authentication system may be conveniently isolated, e.g. hermetically, from the environment such as outdoor environment, which minimizes the risk of damage arising from weather conditions or e.g. vandalism. Accordingly, the reliability of the arrangement is enhanced. Yet, as substantially contact-free authentication is provided, the solution fits various environments with high hygiene standards, e.g. hospitals, particularly well. The components such as sheet 714 may be conveniently changed or refurbished upon need. The versatility and security level of the solution may be improved by additionally utilizing speaker verification preferably at least partially carried out through the user's own mobile terminal.

In some embodiments, successful mobile terminal-based authentication involving speaker verification could provide the user with password or passcode (shown on the mobile display, for instance) to be entered via system 720 for gaining the desired access. Alternatively, the password or -code obtained by the mobile terminal could be input directly from the user terminal to the access control terminal, such as the one of system 720, wirelessly using e.g. NFC (near-field communication) or WLAN.

Item 716 refers to external protection elements such as an embrasure or visor protecting e.g. the sheet 714 from environmental effects such as e.g. rain, snow, dirt or direct sunlight.

Consequently, a skilled person may on the basis of this disclosure and general knowledge apply the provided teachings in order to implement the scope of the present invention as defined by the appended claims in each particular use case with necessary modifications, deletions, and additions.

For example, HTML5 hypertext mark-up language standard includes application program interfaces for camera, voice recording and geolocation. These HTML features could be utilized in connection with the present invention e.g. instead of a (native) client, e.g. Java, application and/or QR reader described hereinbefore. An associated web link could be provided to a user terminal, e.g. to the mobile terminal, included in an SMS (e.g. OTP, one-time password type) message. In more detail, the user could indeed be provided with a message (e.g. the aforesaid SMS or other applicable message type) including a dedicated HTML5 weblink (e.g. with temporary id/session id etc.), whereupon weblink activation triggers QR scanning mode, the QR is then read using the camera, the HTML5 switches to a voice input (uttering) page or view, finally followed by the more conventional transmission of the voice signal e.g. as raw data towards a speaker verification engine (analyzer) optionally along with location data. Such HTML5 based or other similar approach could be considered as an authentication instance-specific native client as the URL in question preferably works only in conjunction with the related authentication event, and the necessary native or native-like feature(s) may be provided within a web page through APIs.

The invention claimed is:

1. An electronic system for authenticating a user of an electronic service, said system comprising:
   at least one server apparatus; and
   a hardware processor configured to store, for a number of users, a plurality of personal voiceprints each of which being linked with a dedicated visual, audiovisual or audio cue, for challenge-response authentication of the users, wherein the cues are user-selected, user-provided or user-created,
   pick, upon receipt of an authentication request associated with a claim of an identity of an existing user of said number of users, a subset of cues for which there are voiceprints of the existing user stored, and provide the cues for representation to the user as a challenge,
   receive sound data incorporating a contact microphone signal, comprising a throat microphone signal, in addition to a mouth microphone signal, comprising a close-speaking microphone signal, the sound data being indicative of voice response uttered by the user to the represented cues,
   determine on the basis of the sound data, the represented cues and voiceprints linked therewith and the existing user, whether the response has been uttered by the existing user of said number of users, wherein the sound data indicative of the voice responses uttered to the represented cues are matched as concatenated against a concatenated voiceprint established based on the voiceprints linked with the represented cues and the existing user, and provided that this is the case,
   elevate the authentication status of the user as the existing user, regarding at least the current communication session
   wherein the hardware processor is further configured to utilize, based on the obtained data indicative of the location of the user, the estimated location of the user as an authentication factor.

2. The system of claim 1, wherein at least one cue comprises a graphical image or video to be shown to the user via a display of a terminal device.

3. The system of claim 1, wherein at least cue comprises an audio file, music or sound scenery file, to be audibly reproduced to the user.

4. The system of claim 1, further configured to initially determine a personal voiceprint for a cue based on a voice response of the user to the cue.

5. The system of claim 1, further comprising a first user terminal for accessing the service and reproducing the cues and a dynamic ID allocated by the system to the user.

6. The system of claim 5, further comprising a second user terminal, a mobile device, comprising application for capturing the voice response by the user.

7. The system of claim 6, wherein the second user terminal is further configured to obtain a dynamic ID allocated to the first terminal, browser thereat, and signal it to said at least one server of the system.

8. The system of claim 7, wherein the second user terminal is configured to read a two-dimensional code representation of the ID shown on the display of the first terminal.

9. The system of claim 1, configured to combine the contact and mouth microphone signals for obtaining authentic signal representing the uttered voice response with stop consonants, nasal cavity, tongue and lips-based sounds preserved.

10. The system of claim 1, configured to apply the contact microphone signal in addition to the mouth microphone signal to reduce the effect of background noise.

11. An electronic device for authenticating a person, the electronic device comprising:
 a voiceprint memory configured to store, for a number of users including at least one user, a plurality of personal voiceprints, each of which being linked with a dedicated visual, audiovisual or audio cue, for challenge-response authentication, wherein the cues are user-selected, user-provided or user-created,
 an authentication hardware processor configured to pick, upon receipt of an authentication request associated with a claim of an identity of an existing user of said number of users, a subset of cues for which there are voiceprints of the existing user stored, and represent the cues in the subset to the person as a challenge, and
 a response provision hardware processor for obtaining sound data incorporating a contact microphone signal, a throat microphone signal, in addition to a mouth microphone signal, the sound data being indicative of the voice response uttered by the person to the represented cues,
 whereupon the authentication hardware processor is configured to determine, on the basis of the sound data, the represented cues and voiceprints linked therewith and the existing user, whether the response has been uttered by the existing user of said number of users, wherein the sound data indicative of the voice responses uttered to the represented cues are matched as concatenated against a concatenated voiceprint based on the voiceprints linked with the represented cues and the existing user, and provided that this is the case,
 to elevate the authentication status of the person as the existing user,
 wherein the electronic device is further configured to utilize, based on the obtained data indicative of the location of the user, the estimated location of the user as an authentication factor.

12. The electronic device of claim 11, being or comprising at least one element selected from the group consisting of: portable communications-enabled user device, computer, desktop computer, laptop computer, personal digital assistant, mobile terminal, smartphone, tablet, wristop computer, access control terminal or panel, smart goggles, and wearable user device.

13. The electronic device of claim 11, configured to control, responsive to the authentication status, access to a physical location or resource, via a controllable locking or unlocking mechanism, electrically controlled lock of a door, lid, or hatch.

14. The electronic device of claim 11, configured to control, responsive to the authentication status, further access to the device itself or a feature, such as application feature or UI feature, thereof or at least accessible therethrough.

15. A method for authenticating a subject person to be executed by one or more electronic devices, comprising:
 storing, by a hardware processor, for a number of users, a plurality of personal voiceprints each of which linked with a dedicated visual, audiovisual or audio cue, for challenge-response authentication of the users, cues being user-selected, user-provided or user-created:
 picking, by the hardware processor, upon receipt of an authentication request associated with a claim of an identity of an existing user of said number of users, a subset of cues for which there are voiceprints of the existing user stored, to be represented as a challenge:
 receiving, by the hardware processor, response incorporating sound data incorporating a contact microphone signal, a throat microphone signal, in addition to a mouth microphone signal, the sound data being indicative of the voice response uttered by the person to the represented cues, wherein the voice response is captured utilizing a throat microphone:
 determining, by the hardware processor, on the basis of the sound data, the represented cues and voiceprints linked therewith and the existing user, whether the response has been uttered by the existing user, wherein the sound data indicative of the voice responses uttered to the represented cues are matched as concatenated against a concatenated voiceprint established based on the voiceprints linked with the represented cues and the existing user, and provided that this is the case: and
 elevating, by the hardware processor, the authentication status of the person acknowledged as the existing user according to the determination,
 wherein the estimated location of the user, based on the obtained data indicative of the location of the user, is further utilized as an authentication factor.

16. The method of claim 15, further comprising controlling access based on the authentication status, wherein access to an electronic resource, such as electronic service, device, or feature accessible using the service or device, or to a physical location or resource, a space or container associated with an electric lock, door, or latch, is controlled.

17. The method of claim 15, wherein a predefined normalization technique is utilized to compensate variation in signal characteristics arising from the used sound capturing equipment, environmental conditions and/or human voice generation mechanism itself.

18. The method of claim 15, wherein said determining comprises utilizing at least one modeling, matching, or normalization element selected from the group consisting of: template matching, hidden Markov model, Gaussian mixture model, dynamic time warping, cepstral coefficients, likelihood ratio based scoring, linear prediction coefficients, blind equalization, H-norm normalization, Z-norm normalization, and T-norm normalization.

* * * * *